United States Patent
Castronovo et al.

(10) Patent No.: US 8,074,671 B2
(45) Date of Patent: Dec. 13, 2011

(54) SELF-CLEANING VALVES FOR USE IN VACUUM CLEANERS AND OTHER SELF-CLEANING VALVES

(75) Inventors: Charles A. Castronovo, Middle River, MD (US); Drew B. Peroni, Dover, PA (US)

(73) Assignees: Applied Magnetics Lab., Inc., Baltimore, MD (US); Charles A. Castronovo, Baltimore, MD (US)

( * ) Notice: Subject to any disclaimer, the term of this patent is extended or adjusted under 35 U.S.C. 154(b) by 579 days.

(21) Appl. No.: 12/133,121

(22) Filed: Jun. 4, 2008

(65) Prior Publication Data

US 2008/0302424 A1    Dec. 11, 2008

Related U.S. Application Data

(60) Provisional application No. 60/942,362, filed on Jun. 6, 2007.

(51) Int. Cl.
    *F16K 25/00*    (2006.01)
(52) U.S. Cl. .................... 137/15.06; 137/242; 137/244; 251/333
(58) Field of Classification Search ............... 137/15.06, 137/242, 244, 15.07, 243.6, 875, 625.44; 251/333
    See application file for complete search history.

(56) References Cited

U.S. PATENT DOCUMENTS

| | | | |
|---|---|---|---|
| 950,351 A * | 2/1910 | Shapley | 137/242 |
| 1,105,209 A * | 7/1914 | Sauchereau | 137/242 |
| 1,153,751 A | 9/1915 | Beth | |
| 1,314,559 A | 9/1919 | Wilson | |
| 2,213,998 A | 9/1940 | Sifkovitz | |
| 2,543,342 A | 2/1951 | Timm | |
| 2,543,343 A | 2/1951 | Timm | |
| 2,628,630 A | 2/1953 | Calhoun | |
| 3,269,414 A | 8/1966 | Mayo | |
| 4,050,473 A | 9/1977 | Cho | |
| 4,063,326 A | 12/1977 | Fromknecht | |
| 4,229,193 A | 10/1980 | Miller | |
| 4,236,547 A | 12/1980 | Harasewych | |
| 4,237,920 A | 12/1980 | Norman | |
| 4,244,555 A | 1/1981 | Maggioni et al. | |
| 4,249,561 A | 2/1981 | Marttinen | |
| 4,305,419 A | 12/1981 | Moen | |
| 4,412,632 A | 11/1983 | Berger et al. | |
| 4,424,917 A | 1/1984 | Berger et al. | |
| 4,719,938 A | 1/1988 | Pandorf | |
| 5,186,205 A * | 2/1993 | Bachmann | 137/242 |

(Continued)

FOREIGN PATENT DOCUMENTS

DE    1035434    7/1958

(Continued)

*Primary Examiner* — Kevin Lee
(74) *Attorney, Agent, or Firm* — Whitham Curtis Christofferson & Cook, PC

(57) ABSTRACT

A self-cleaning valve assembly is provided, such as for use in a vacuum cleaner such as a particularly advantageous vacuum cleaner system that has at least two filters and self-cleans its filters via back-flushing, without needing to stop normal operation to self-clean. Also, a vacuum cleaner is provided that uses permanent, self-cleaning filters, and does not need disposable filters or filter bags, and advantageously can use inexpensive plastic bags. In another vacuum cleaner system, waste is collected in an ordinary plastic bag without any special preparation or modification of the bag being needed. Further, an inventive self-cleaning X-valve assembly cleans itself and is useable in the vacuum cleaner system.

17 Claims, 9 Drawing Sheets

U.S. PATENT DOCUMENTS

| | | |
|---|---|---|
| 5,199,684 A | 4/1993 | Maples |
| 5,222,833 A * | 6/1993 | Gorlov .................... 405/76 |
| 5,226,213 A | 7/1993 | Lewis et al. |
| 5,241,989 A * | 9/1993 | Kalavitis ................. 137/613 |
| 5,515,909 A * | 5/1996 | Tanaka ...................... 165/4 |
| 6,116,264 A * | 9/2000 | Bachmann et al. .......... 137/240 |
| 6,209,751 B1 | 4/2001 | Goodin et al. |
| 6,446,660 B1 | 9/2002 | Usabiaga |
| 6,458,178 B1 | 10/2002 | Dietz |
| 6,516,897 B2 | 2/2003 | Thompson |
| 6,832,595 B2 | 12/2004 | Klein et al. |
| 6,920,665 B2 | 7/2005 | Tucker |
| 7,128,084 B2 | 10/2006 | Long et al. |
| 7,438,735 B2 | 10/2008 | Kelsey |
| 2002/0035920 A1 | 3/2002 | Everingham et al. |
| 2003/0172895 A1 | 9/2003 | Klein et al. |
| 2004/0045124 A1 | 3/2004 | Lindquist et al. |
| 2006/0131528 A1 | 6/2006 | Long et al. |
| 2008/0302424 A1 | 12/2008 | Castronovo et al. |
| 2009/0000485 A1 | 1/2009 | Valentini |
| 2010/0000995 A1 | 1/2010 | Yarbrough |

FOREIGN PATENT DOCUMENTS

| | | |
|---|---|---|
| DE | 8815581 | 2/1989 |
| EP | 0750144 | 12/1996 |
| WO | WO 97/18069 | 5/1997 |
| WO | WO 99/11955 | 3/1999 |
| WO | WO 03/084832 | 10/2003 |

\* cited by examiner

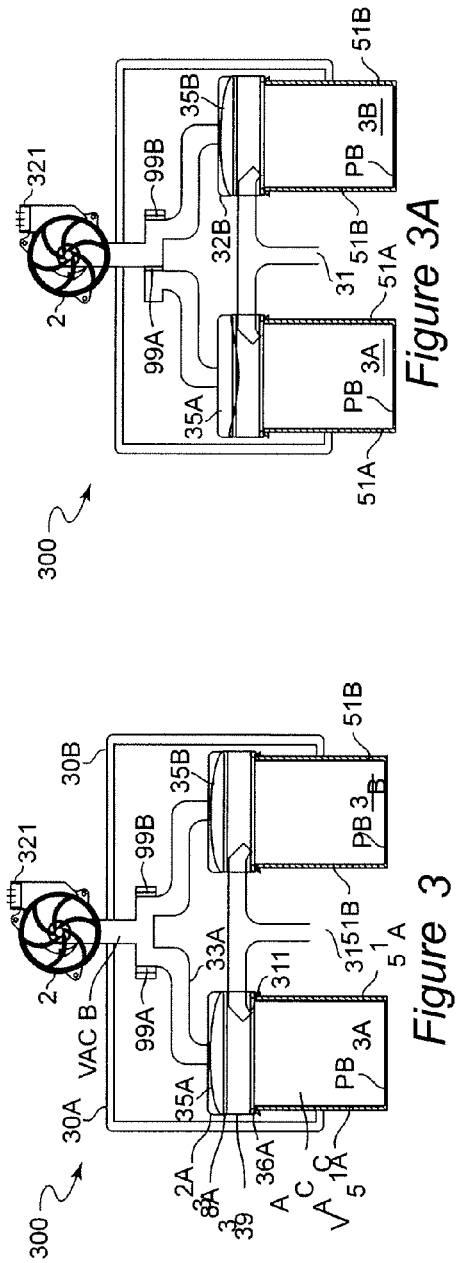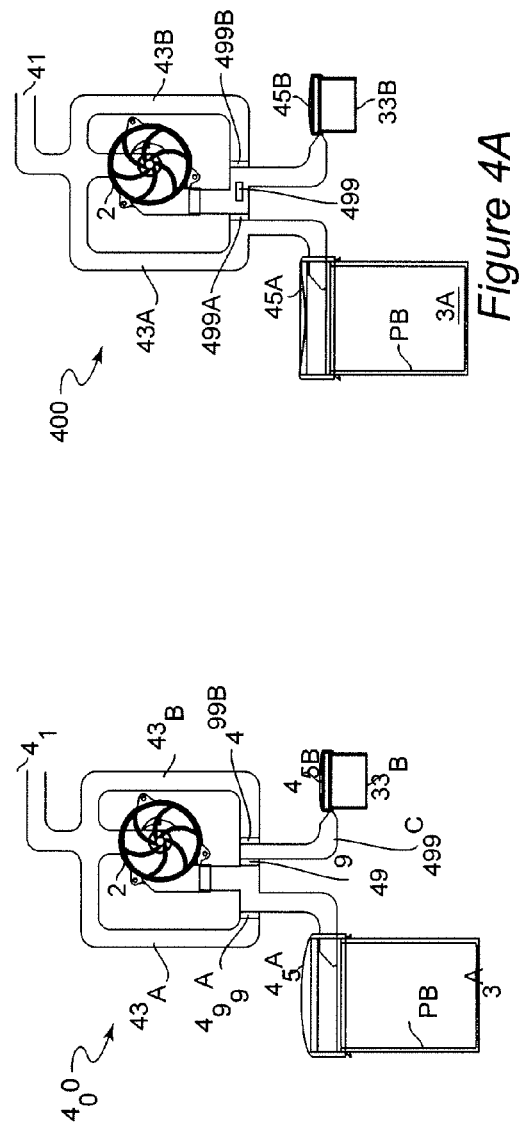

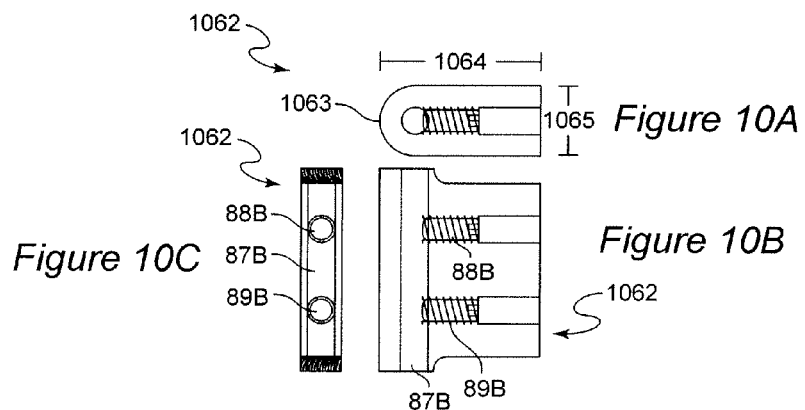
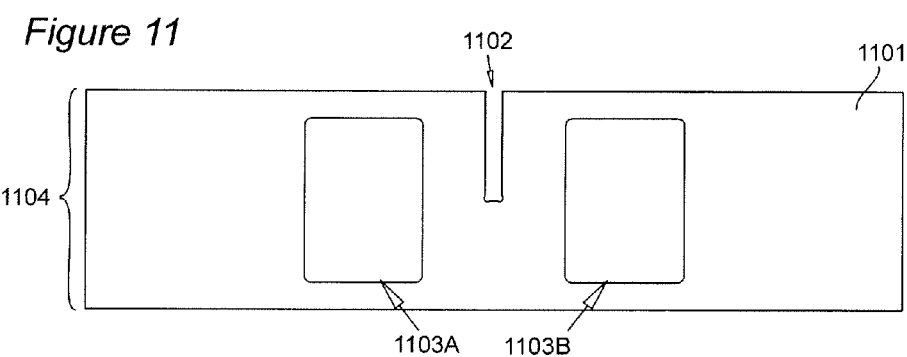
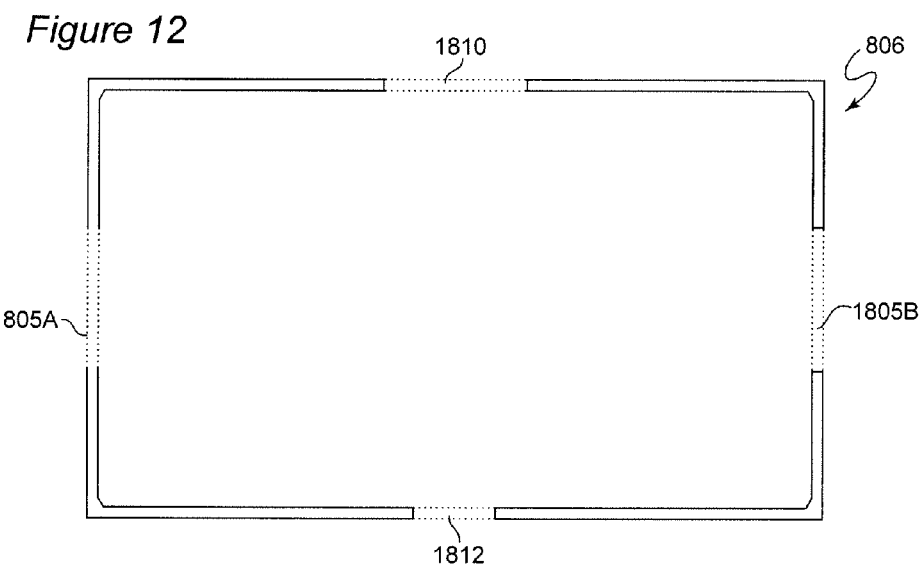

SELF-CLEANING VALVES FOR USE IN VACUUM CLEANERS AND OTHER SELF-CLEANING VALVES

RELATED APPLICATIONS

Benefit is claimed of U.S. provisional application No. 60/942,362 filed Jun. 6, 2007. This application is related to the U.S. application filed Jun. 4, 2008 by Charles Castronovo titled "Vacuum cleaners with self-cleaning filtration, and other self-cleaning filters."

FIELD OF THE INVENTION

The present invention generally relates to valves, especially to self-cleaning valves used in vacuum cleaners and other mechanical systems.

BACKGROUND

For vacuum cleaners, the state of the art is a conventional workshop vacuum, which is a sealed canister with a lid. The vacuum suction is provided by a vacuum motor unit, usually mounted through the lid. A foam filter sleeve is typically included on the suction inlet, around which there may be disposed a bag or filter element. Such workshop vacuums typically use a "Clean Impeller System," in which the vacuum impeller (or "fan") itself does not encounter dirt, because dirt is filtered from the air before the air reaches the impeller. An inlet for the hose is typically located on the side of the canister. The vacuum motor draws air and dirt into the canister via the inlet hose. The canister is at highly reduced pressure. Debris falls down in the canister. The canister may or may not be lined with a filter bag, which traps the vacuumed debris. Air goes through the filter or filter bag, then through the vacuum motor unit, and out into the ambient air. If a bypass feature is included, ambient air is used for motor cooling. The motor-cooling air is separate from the dirty air in a good workshop vacuum (such as in vacuum "head" units made by Ametek Corp., which are used in many brands of workshop vacuum units). The vacuum "head" unit is the critically important subassembly of a vacuum cleaner, composed primarily of a motor that drives an impeller. The impeller is enclosed within a carefully shaped impeller housing.

Such "clean impeller" systems often have custom-made filter bags which make emptying the canister neater, quicker, and easier. In this approach, the same canister is used as in the conventional workshop vacuum, with a same side nozzle. A large closed paper bag is deployed within the canister; viewed in laid out manner, the bag is rectangular, with a cardboard "collar" in the bag's middle through which the dirty air enters the bag. The collar hooks over the canister's interior projection of the hose nozzle and the canister is lined with the bag. The customer purchases the particular bag customized to the canister. Disadvantageously however, the user must replace the separately-purchased proprietary filter bags every time the vacuum unit was emptied. Conventional "clean impeller" workshop vacuum systems are relatively simple, cheap and reliable. However, disadvantageously, disposable, inexpensive plastic bag liners seemingly cannot practically be incorporated because 1) the bag must be penetrated with the nozzle which breaks the bag seal; and 2) when the workshop vacuum is turned on, a lightweight, inexpensive disposable plastic bag would collapse due to the vacuum inside the canister. Thus there would be nowhere for the dirt to accumulate inside the plastic bag.

Another category of vacuum cleaners is "Dirty Impeller Vacuum Systems." Dirt and air are drawn directly into the impeller, and the canister is pressurized by the air-plus-dirt output of the impeller, in contrast to "clean" impeller systems. A vacuum impeller can be designed to deal directly with unfiltered, dirt-laden air by altering its blade and fan geometry, selecting appropriate blade materials, and sometimes also coating blades to prevent dirt from sticking to them. The system then pumps air and dirt together into the canister. Clean air is exhausted from the canister via elaborate filters, which get clogged. If the air filter is a filter bag, put over the top of the canister, the filter bag's pores get clogged. When the time comes to empty the canister, usually the bag needs replacing or cleaning.

Vacuum cleaner systems are used in a variety of applications. One application in which vacuum cleaner systems are used is in security destruction machines. Vacuum systems are used in some, but not all, conventional destruction machines. For example, in many conventional shredders, no vacuum is used and the shredded pieces are simply permitted to fall into a waste receptacle. Some high-security shredders do have vacuums, however.

One type of destruction machine is a "disintegrator" which is a certain category of larger destruction machines. A car-sized disintegrator known as Kobra Cyclone, made by Elcoman (Italy) collects waste in a pressurized plastic bag, which lines a large (100 gallon) canister.

An example of operation of a conventional shredder is use of a canister lined with a bag, with a lid on the canister, with a nozzle attached, and the filter bag clamped on, and deployed above the canister. Such structures are sometimes known as "bag houses" (when used in large industrial applications) and may be in an array. The bags in bag houses are all pressurized. Air and dust enter the bag houses through an entry port. The dust tends to fall into the container below the bags. The air comes out through the bags and gets filtered, while the dust stays below, and inside the canister or Bin. In some devices, the "bag house" is simply the cloth or paper bag itself, suspended above the collection canister or Bin. However, this conventional design suffers from the problem of the filter needing frequent cleaning, which requires stopping normal disintegrator operation to permit filter-cleaning. The finer the dust or dirt being filtered, the larger the filter must be, and the more often it needs cleaning.

SUMMARY OF THE INVENTION

In the course of inventing and constructing inventive shredders and other destruction machines, the present inventor found that conventional vacuum systems suffered from disadvantages and/or deficiencies such as the inability (in a truly practicable way, in spite of prior attempts in the art) to use an ordinary plastic bag to collect waste, requiring a custom filter bag to collect waste, and/or requiring cessation of vacuum operation (and therefore also destruction in security or non-security destruction machines) to accomplish filter-cleaning. Therefore he invented a self-cleaning filter system for use in a vacuum cleaner system especially useable with a destruction machine (such as, e.g., a paper shredder, information-security disintegrator, etc.) but not limited thereto.

With a self-cleaning filter system in which filtration need not be stopped while filter cleaning (e.g., back-flushing) is performed, the invention provides for storing filter-cleaning waste along with "normal" waste (e.g., the waste from vacuum-cleaning), with all of the stored waste stored together until emptying. Preferably the invention is applied in a vacuum cleaning application, but the invention is extendible to other applications.

In one preferred embodiment, the invention provides a vacuum cleaner comprising: at least one back-washable filter disposed in a back-washing system; a back-washing system which in operation back-washes the at least one back-washable filter, the back-washing system configured to be operable without cessation of a primary vacuum cleaning operation; and a capture system that captures waste cleaned from the filter, such as, e.g., an inventive vacuum cleaner including at least two back-washable filters; an inventive vacuum cleaner including: a clean vacuum system; and a plastic bag disposed in the vacuum cleaner; an inventive vacuum cleaner comprising a container that receives the captured waste (such as, e.g., an inventive vacuum cleaner wherein the container that receives the captured waste is pressurized, an inventive vacuum cleaner wherein the container that receives the captured waste is operated under vacuum; etc.); an inventive vacuum cleaner comprising an attachment port to which is attachable a plastic bag in which is received waste; an inventive vacuum cleaner comprising at least two back-washable filters; an inventive vacuum cleaner containing no backflush drain; an inventive vacuum cleaner comprising a pathway through which is routed waste cleaned from the filter to join routinely (i.e., regularly) vacuumed debris; an inventive vacuum cleaner comprising a self-cleaning valve assembly; and other inventive vacuum cleaners.

In another preferred embodiment, the invention provides a vacuum cleaner comprising: a clean-source vacuum system, a plastic bag disposed in the vacuum cleaner without a solid insert associated with the plastic bag, and at least one self-cleaning filter; such as, e.g., an inventive vacuum cleaner comprising a self-cleaning valve assembly; etc.

The invention in a further preferred embodiment provides a mechanical device comprising: at least two back-washable air flow filters (such as, e.g., filters configured to separate dust from airflow; filters that are "permanent"; etc.), the filters each having a structure to filter a primary fluid flow; a back-washing system which in operation back-washes a particular filter; and a capture system (such as, e.g., a capture system that includes no waste drain or backflush drain) that captures waste cleaned from the filter, the back-washing system configured such that while a particular filter is being back-washed, at least one filter is not being back-washed and is continuing to filter the primary fluid flow; such as, e.g., an inventive mechanical device having no waste drain connected to the mechanical device; an inventive mechanical device comprising a pressurized container in which is received captured waste; an inventive mechanical device disposed in a vacuum cleaner; an inventive mechanical device disposed in a car or vehicle; an inventive mechanical device disposed in an air conditioning system; an inventive mechanical device comprising an attachment port to which is attachable a plastic bag in which is received waste; an inventive mechanical device comprising a vacuum impeller or pump, wherein the vacuum impeller or pump may be in contact with dirt or not in contact with dirt; an inventive mechanical device comprising a pathway through which is routed waste cleaned from the filter to join waste from the primary fluid flow; an inventive mechanical device comprising a self-cleaning valve assembly; etc.

The invention in another preferred embodiment provides a vacuum cleaner waste collection structure comprising: at least one container (such as, e.g., a plastic bag, etc.) for receiving waste, the container being susceptible of forced inflation by application of a differential vacuum; and a source of the differential vacuum.

In another preferred embodiment, the invention provides a vacuum cleaner in which waste may be collected in a plastic bag or plastic bag-like container without needing an insert structure inside the plastic bag, comprising: a cage into which is received the bag or container, the cage comprising: (a) a membranous structure in at least some places where the bag or container contacts the cage; or (b) a structure such that a differential vacuum can be applied to keep the bag or container expanded.

The invention also in a further preferred embodiment provides a waste collection method, comprising: disposing a bag or container (such as, e.g., a plastic bag, etc.) within a cage that comprises a structure such that a differential vacuum can be applied to keep the bag or container expanded; applying a differential vacuum to keep the bag or container expanded; and collecting waste in the expanded bag or container; such as, e.g., an inventive waste collection method wherein the steps are performed in a vacuum cleaner; an inventive waste collection method further comprising a step of self-cleaning at least one back-flush filter; etc.

In another preferred embodiment, the invention provides a method in which a mechanical system containing at least a first filter (such as, e.g., a filter disposed in a vacuum cleaner, etc.) for a first Bin's air exhaust and a second filter (such as, e.g., a filter disposed in a vacuum cleaner, etc.) for a second Bin's air exhaust self-cleans the filters, comprising: back-washing each filter whereby a quantity of waste is cleaned therefrom; and capturing the quantity of waste cleaned from the filters (such as, e.g., a step of waste capturing that comprises collecting waste in a pressurized container; a step of waste capturing that comprises collecting waste in an evacuated container; etc.), wherein the mechanical system practices the back-washing and the waste capturing steps; the method including: self-cleaning waste from the filter associated with the first Bin's air exhaust and depositing waste cleaned from the filter associated with the first Bin into the second Bin, and further comprising self-cleaning waste from the filter associated with the second Bin and depositing waste cleaned from the filter associated with the second Bin into the first Bin; such as, e.g., an inventive method practiced without releasing any of the captured waste to an environment in which the mechanical system operates; an inventive method comprising subjecting the filter to airflow including dust, debris and/or particulate matter; an inventive method comprising subjecting the filter to a fluid comprising airflow and a quantity of a liquid; an inventive method comprising pressurizing a container which receives the quantity of waste cleaned from the filter; an inventive method comprising collecting waste from the capturing step in a plastic bag; an inventive method comprising back-washing a filter followed by capturing waste self-cleaned from the back-washing; an inventive method practiced in a vacuum cleaner and the filter back-washing step and/or the waste capturing step is performed without stopping the vacuum cleaner from continued operation in normal cleaning mode; an inventive method wherein no backflush draining is performed; an inventive method performed in a vacuum cleaner and that comprises routing the quantity of waste cleaned from the filter to join a quantity of vacuumed debris; an inventive method comprising the filter system continuing to filter during back-washing; etc.

In another preferred embodiment, the invention provides a valve structure, comprising: a self-cleaning valve assembly disposed in a vacuum cleaner.

Further in a preferred embodiment, the invention provides an X-valve assembly, comprising: an X-structure, a first vane including a rounded pivot end and a second vane including a rounded pivot end, wherein the rounded pivot end of the first vane is fixed into a first angle of the X-structure and the rounded pivot end of the second vane is fixed into a second angle of the X-structure, the second angle being opposite the first angle, and the first angle and the second angle being equal (such as, e.g., equal 60 degree angles). Each vane comprises a first flat port-closing edge for closing a port in the X-structure that opens into a space in a vicinity of a vacuum port; and a second flat port-closing edge for closing a port in the X-structure that opens into a space in a vicinity of an inlet through which dusty air enters; the first vane services a pair of such ports in the first angle; the second vane services a pair of such ports in the second angle.

In another preferred embodiment, the invention provides a self-cleaning valve system, comprising an X-valve system, preferably, a solids-handling valve which does not suffer from clogging. A "self-cleaning" valve refers to one that is self-clearing for dust and debris, such as via wiping action near a vane pivot and using a slight overlap of vane-to-port in order for the valve to be non-clogging and self-cleaning for dust and debris.

The invention in another preferred embodiment provides a method for a valve assembly (such as, e.g., an X-valve assembly) that comprises a vane servicing at least one port to clean itself of dust, the method comprising: moving the vane to a position different from a normal operating position of the vane and into a path of airflow moving in a direction that conducts a wiping action on at least the vane (such as, e.g., a wiping action near a pivot of the vane; a wiping action on the vane and on a region near the port serviced by the vane; etc.).

In another preferred embodiment the invention provides a valve assembly comprising: a V-shaped structure having a first wall and a second wall, the first wall having therein a first port and the second wall having therein a second port; a vane, the vane comprising: a curved end disposed into the V-shaped structure where the first wall and the second wall meet; a first flat edge sized to close the first port and a second flat edge sized to close the second port; wherein the vane is movably disposed into the V-shaped structure, with the vane pivoting between a first port-closed-position and a second-port-closed position, such as, e.g., an inventive valve assembly wherein the first wall and the second wall form a 60 degree angle; an inventive valve assembly comprising the V-shaped structure and a twin V-shaped structure formed in an X-shaped structure; etc.

BRIEF DESCRIPTION OF THE DRAWINGS

FIG. 3 illustrates a third inventive embodiment in normal operation. The operating principle for FIG. 3 is of a "clean" vacuum source, with a bag.

FIG. 3A illustrates cleaning of filter 35A for the system 300 of FIG. 3.

FIG. 4 illustrates a fourth inventive embodiment in normal operation, in which a "dirty" vacuum source is used, and there is a first large waste bin-with-filter and another smaller second bin with a filter that is smaller than the first bin's filter.

FIG. 4A illustrates cleaning of filter 45A for the system of FIG. 4.

FIG. 7A shows an enlarged view of FIG. 6 in a vicinity of bin nozzle 700B, during normal operation of system 106 in which membrane 55B and associated lid are inflated upwards. FIG. 7B shows, during a cleaning operation, a membrane and lid sucked downwards. FIG. 7C shows, during the system being switched off, a membrane and lid in relaxed position.

FIG. 8A is a plan view of an inventive X-valve assembly; FIG. 8B is a front elevation view of the inventive X-valve assembly of FIG. 8A.

FIG. 9A shows the vane 62A of FIG. 8A at 0 degrees; FIG. 9B shows the vane 62A at 30 degrees; FIG. 9C shows the vane 62A at 55 degrees; FIG. 9D shows the vane 62A at 60 degrees which is a closed position.

FIGS. 10-12 show examples of parts useable in an embodiment of an inventive self-cleaning valve.

FIG. 10A is a top view of a vane useable in FIGS. 8A-9D. FIG. 10B is a front view corresponding to FIG. 10A. FIG. 10C is a side view corresponding to FIGS. 10A-10B.

FIG. 11 shows an X-plate (FIG. 8A) laid out in flat, two such X-plates being useable to form an X-structure 801.

FIG. 12 is a cross-sectional view from the top of a valve shell 806 (FIG. 8A).

DETAILED DESCRIPTION OF A PREFERRED EMBODIMENT OF THE INVENTION

The invention in a preferred embodiment may be appreciated with reference to FIGS. 1-4B, in which are shown vacuum cleaner systems having the important advantage of being able to self-clean their own filters while normal vacuuming operation proceeds. Vacuum operation unburdened by a requirement to stop and filter-clean is wanted in a variety of applications, such as, e.g., when the vacuum system is used in conjunction with shredding and destruction (of which preferred examples are desk-top and large sized security destruction machines, shredders and other destruction machines), when the vacuum system is in a shop-vac, when the vacuum system is in a consumer home vacuum cleaner, etc.

Examples of a vacuum source useable in an inventive vacuum cleaner are, e.g., a centrifugal impeller type vacuum fan; a positive-displacement vacuum or air pump; a bellows-type air pump; a scroll-type compressor or pump; etc.

Herein "a clean-source vacuum system" means and refers to one in which the air-vacuuming device does not contact vacuumed debris.

An example of accomplishing filter self-cleaning without stopping normal operation is, e.g., providing at least two filters each of which filter is associated with its own Bin, with one filter being back-flushable (i.e., back-washable) without stopping normal operation through the other filter, with the back-washed dirt from cleaning a first filter being sent into the second filter's Bin and, in due course, the back-washed dirt from cleaning the second filter being sent into the first filter's Bin. The at least two Bins may be the same size or of different sizes. Some examples of inventive self-cleaning vacuum systems are shown in FIGS. 1-4B and discussed in Examples 1-4 below.

For switching between normal operation and respective cleaning operations, there may be used valves. Examples of valves to use are, e.g., a classic slide valve, a rotary valve, a sliding valve, a flapper valve, etc. Blocking and unblocking of the valves is accomplished via conventional manual, electro-mechanical, and/or automated actuators. The shape of the elements inside the valve is important to consider. Structures in which valve clogging can occur should be avoided. For example, in vacuum cleaner applications, a vane- (or flapper-) type valve may be used. The inventor favors an anti-clogging assembly in which materials which can clog the valve are kept away from the sealing parts of the valve. A slide valve probably also is feasible but is more expensive and may jam with dust more easily (especially at the sliding-component interfaces). Preferably the valve is operable via a conventional solenoid, pneumatic, hydraulic, or motor actuator. Alternately, but less preferably in many applications, manual handles could be used to operate the self-cleaning system and actuate the valves. These are only several examples and it should be appreciated that there are many ways to actuate the valves.

Figure 8A:
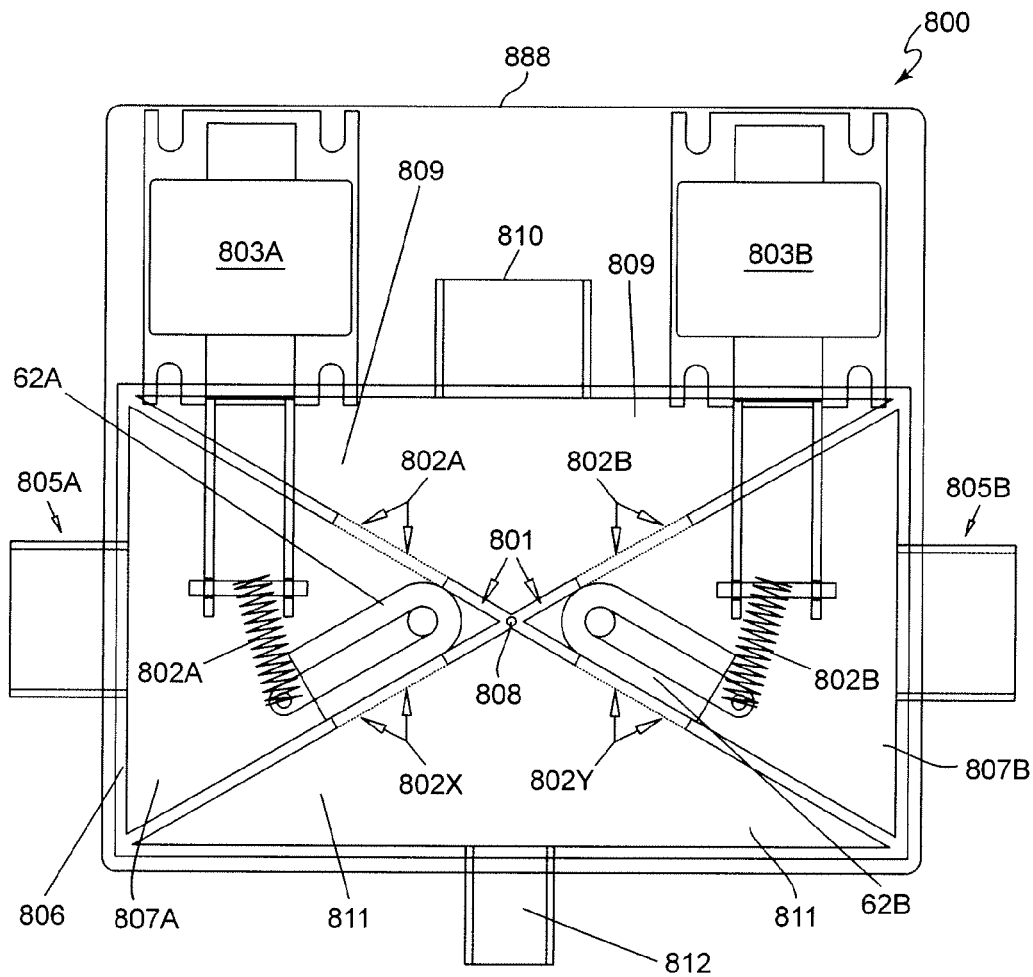
FIGS. 8A-8B show an embodiment of an inventive self-cleaning "X-valve" useable in FIGS. 6-6A and other embodiments of the invention.

A preferred example of a valve to use is a self-cleaning valve, such as, e.g., a self-cleaning valve, preferably, a self-cleaning X-valve such as X-valve assembly 800 (FIG. 8A).

Examples of hardware and circuitry useable with an inventive vacuum system (e.g., a vacuum system according to FIG. 1, 2, 3 or 4) are as follows.

An inventive vacuum system may be operated via a circuit board. Preferably there is included an indicator, such as, e.g., an indicator light that signifies that actuation of the cleaning cycle is in progress. An example of a cleaning cycle is, e.g., a four second cleaning cycle. The indicator light signifies that the self-cleaning is operating. There may also be included an automated vacuum or Bin pressure measurement, or manual button as controls.

A feedback circuit may be connected to the vacuum. Vacuum may be measured in the hoses, with a connection to a sensor, and the vacuum motor is controlled to maintain a desired degree of vacuum suction for the specific application.

An example of a power source is, e.g., a 120 or 220-volt source.

Each valve actuator may be connected to electrically operate it.

The cleaning cycle may be actuated via operator determination by reading a pressure gauge. When the filter gets blocked, the canister pressure increases, therefore indicating necessity to clean the filter. Alternately, a timing cycle may be used, such as a timing cycle based on typical loads.

A spring may be included for making a weight-based measurement that a bin is "full."

This self-cleaning filter invention may be used in a variety of applications, including, e.g., applications serving a high load of debris per unit of total air plus debris volume (such as, e.g., greater than 50% of total volume). Conventionally high loads of debris per unit volume were handled with very large filters in order to avoid having to change the filter to clean the filter constantly. However, the present invention may be used to reduce the filter size used for a high load of debris per cubic inch. The invention makes possible a very small filter, comparatively speaking, for a given load of debris per unit volume. Therefore the invention also provides a method of reducing filter size compared to that which is filtered.

Another advantage of the invention is that in many embodiments the filter is permanent, or practically permanent.

The inventor meanwhile also was considering the problem of wanting a "clean impeller type" vacuum cleaner that ALSO could operate using only an ordinary plastic bag, without needing any custom-made collection bag. The inventor solved the problem of how to be able to use an ordinary disposable (and relatively impermeable) plastic bag inside a "clean impeller" type canister by applying vacuum to the interior of the plastic bag and by establishing a higher-intensity vacuum at the exterior of the plastic bag, thus keeping the plastic bag "inflated" or expanded by the pressure difference between the interior and exterior of the bag (see, e.g., Example 3 and FIG. 3, etc.).

In a preferred embodiment of the invention, a "clean impeller type" vacuum system is used with a disposable impermeable bag (e.g., a garbage bag, paper bag, etc.). Preferably, a plastic bag or other liner is used within a bin with at least one section of "open" (i.e, not dense or tightly woven) mesh (such as, e.g., a mesh cylindrical section; a mesh basket; a mesh cylindrical section with a detachable mesh floor; etc.) disposed between the exterior surface of the plastic bag and the interior surface of the bin. Most preferably, a plastic bag or other liner is used within a mesh-walled container (the container walls not being required to be all-mesh) which mesh-walled container is itself disposed within a canister. The mesh section allows trapped air between the plastic bag and the bin to be evacuated, thus permitting the plastic bag to fully expand into the bin space. A differential vacuum is established, such as by using the structure shown in FIG. 3 (see Inventive Example 3 below). Other methods of allowing trapped air between the plastic bag and the bin to vent may be used.

It should be appreciated that although advantageously the inventor provides for being able to use a plastic bag in embodiments of the invention, using a plastic bag is not required in all embodiments of the invention such as in non-vacuum-cleaner self-cleaning filter applications, no-liner vacuum cleaner self-cleaning filter applications, standard-liner vacuum cleaner self-cleaning filter applications, etc.

Some comparative examples are mentioned from which to better appreciate the invention, followed by some inventive examples (without the invention being limited to the examples below).

COMPARATIVE EXAMPLE 1

In this conventional vacuum cleaner system is used a filter-duty paper, box-style bag with an aperture (commonly in the industry called a "collar") fitted to conform to a nozzle, and a separate filter element for the vacuum source.

COMPARATIVE EXAMPLE 1A

Trying to modify Comparative Example 1 by replacing the filter-duty paper, box-style bag with a plastic bag fails because the bag will simply collapse, and also will not pass air through to the vacuum source.

COMPARATIVE EXAMPLE 2

A conventional high-security disintegrator has attached thereto a vacuum system using a dirty impeller, a Bin and a filter. Waste is collected in a disposable bag.

INVENTIVE EXAMPLE 1

The inventor constructed a structure for commercial use in a destruction machine.

Figure 1:
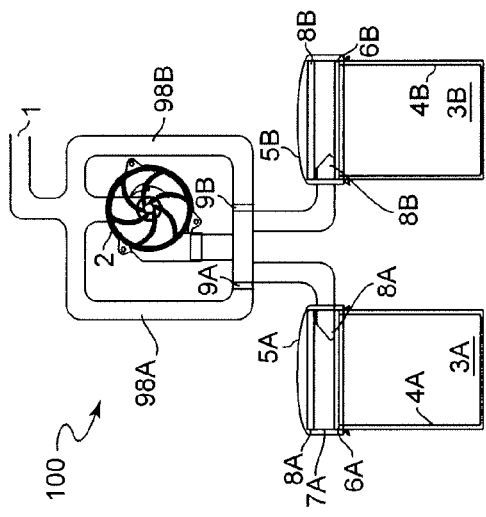
FIG. 1 illustrates a cross-sectional view of a first inventive embodiment in normal operation, for an embodiment operating with a "dirty" vacuum source, wherein a bin is pressurized and no bonnet is included.

Referring to FIG. 1, in normal vacuuming operation, dust-containing air (not shown) enters the vacuum system 100 at suction inlet 1. During normal vacuuming operation, valves 9A, 9B are closed. The vacuum source is a dirty-impeller vacuum source. Dust-containing air travels from suction inlet 1 to pump (vacuum source) 2. Air and dust are blown out from the pump (vacuum source) 2, into two Bins 3A, 3B. In normal vacuuming operation, dust and air are blocked from traveling through valves 9A, 9B, and will travel into bins 3A, 3B. Optionally, bins 3A, 3B may respectively each be lined by liners 4A, 4B (an example of a liner being, e.g., a commercially available trash bag liner). Dust travels into bins 3A, 3B and falls into the bottom of the Bins 3A, 3B. Filtered exhaust air exits out through the respective filters 5A, 5B at the top of the bins 3A, 3B. For best self-cleaning operation, the filter media of filters 5A, 5B should be of the "surface loading" type, meaning that dust is trapped at the surface of the filter fabric. Such material is readily available from multiple industrial sources. Further, many of these filter "fabrics" are made of synthetic materials and many are washable in water by ordinary means. The Bins 3A, 3B are ordinary sturdy Bins each preferably but optionally lined with a plastic bag. Clamp rings 6A, 8A hold and seal the filter 5A, liner 4A and top of the bin 3A. Bin 3B, liner 4B and filter 5B are likewise held and sealed with their own clamp rings 6B, 8B.

Figure 1A:
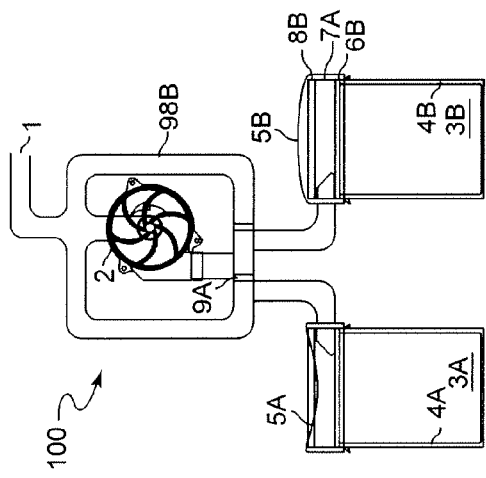
FIG. 1A illustrates cleaning of filter A for the system of FIG. 1.

Cleaning Cycle for Bin 3A:

As shown in FIG. 1A, during cleaning operation of Filter 3A, (clean) filter cleaning air enters from an outside environment downwards through filter 5A into Bin 3A. Please note the position of valves 9A and 9B in FIG. 1A, compared to FIG. 1. Valve 9A has shifted to connect Bin 3A to pump 2's vacuum instead of pump 2's output. Valve 9B has NOT shifted.

Dirty (filter-cleaning) air from bin 3A exits bin 3A and travels through pipe 98A to inlet of vacuum pump 2. Meanwhile inlet 1 ALSO continues to take in dirty air from the outside dirty air source. (In pipe 98B, there is NO air flow during this cleaning operation of Filter 3A.) Thus, pump 2 is pumping dirty air from BOTH the original source of dirty air and the filter-cleaning dirty air from Bin 3A.

Bin 3B continues to receive the combined dirty air from pump 2, and also continues to exhaust clean air through its filter 5B.

At the end of the cycle, Valve 9A returns to its normal position, and both bins 3A, 3B and filters 5A, 5B operate normally.

Cleaning Cycle for Bin 3B:

Cleaning filter 5B is accomplished using the above principles for the cleaning of filter 5A, by shifting Valve 9B to the left. Thus Bin 3B's dirty filter 5B is backwashed into Bin 3A. At the end of the cycle, Valve 9B returns to its normal position, and both bins 3A, 3B and filters 5A, 5B operate normally.

Those skilled in the art will recognize that the two Bins in any of the inventive examples herein could also be simply two separate chambers within the same structure.

In FIG. 1, an extension ring 7A provides a way for the entry nozzle 8A to deliver dust-laden air into Bin 3A without requiring nozzle 8A to penetrate liner 4A, thus leaving liner 4A intact for easy closure and removal when liner 4A is full. Nozzle 8B operates likewise with respect to bin 3B.

Referring to FIG. 1, a pressurized Bin system is used regardless of whether or not the optional trash bag liner 4A or 4B is in place.

(For an example like Inventive Example 1 but using a bonnet and a mesh, see Inventive Example 3)

In FIG. 1, in normal vacuuming operation, about 3-4 levels of vacuum exist. The vacuum levels are discussed in relative terms. Referring to FIG. 1 in normal cleaning operation, at the point nearest the vacuum motor's suction inlet (the maximum system vacuum point) the vacuum level equals $vac_A = vac_{MAX}$. At the T-junction above the valves 9A, 9B, the vacuum is $vac_B$, indicating some vacuum drop compared to $vac_A$. The vacuum "drop" is completely analogous to the well-known "pressure drop" in pipes containing a FLOWING liquid or gas. With liquids or gas flowing (not static), the pressure decreases as you get further "downstream" from the pressure source. Similarly, in a flowing vacuum system, the vacuum level decreases as you get further "upstream" from the vacuum source.

To summarize:

$Vac_A$ occurs at the vacuum motor's suction inlet. It is the most intense vacuum.

$Vac_B$ occurs at T-junction above valves 9A, 9B (FIG. 1). It is less intense than $vac_A$.

$Vac_C$ is the normal vacuum level occurring in the bins. It is less intense than $vac_B$.

$Vac_D$ occurs at dust inlet 1 in FIG. 1. It is the least-intense vacuum.

INVENTIVE EXAMPLE 1A

In a destruction machine embodying a vacuum system 100 according to FIG. 1, $vac_{max}$ (which occurs at the vacuum unit inlet) depends on what the feedback system is measuring at vacD. As filters 5A, 5B become clogged, harder work has to be done to maintain the desired level at $vac_D$ and the control system would thus command increased power to the vacuum source motor. Having a control system is advantageous.

INVENTIVE EXAMPLE 1B

Figure 6:
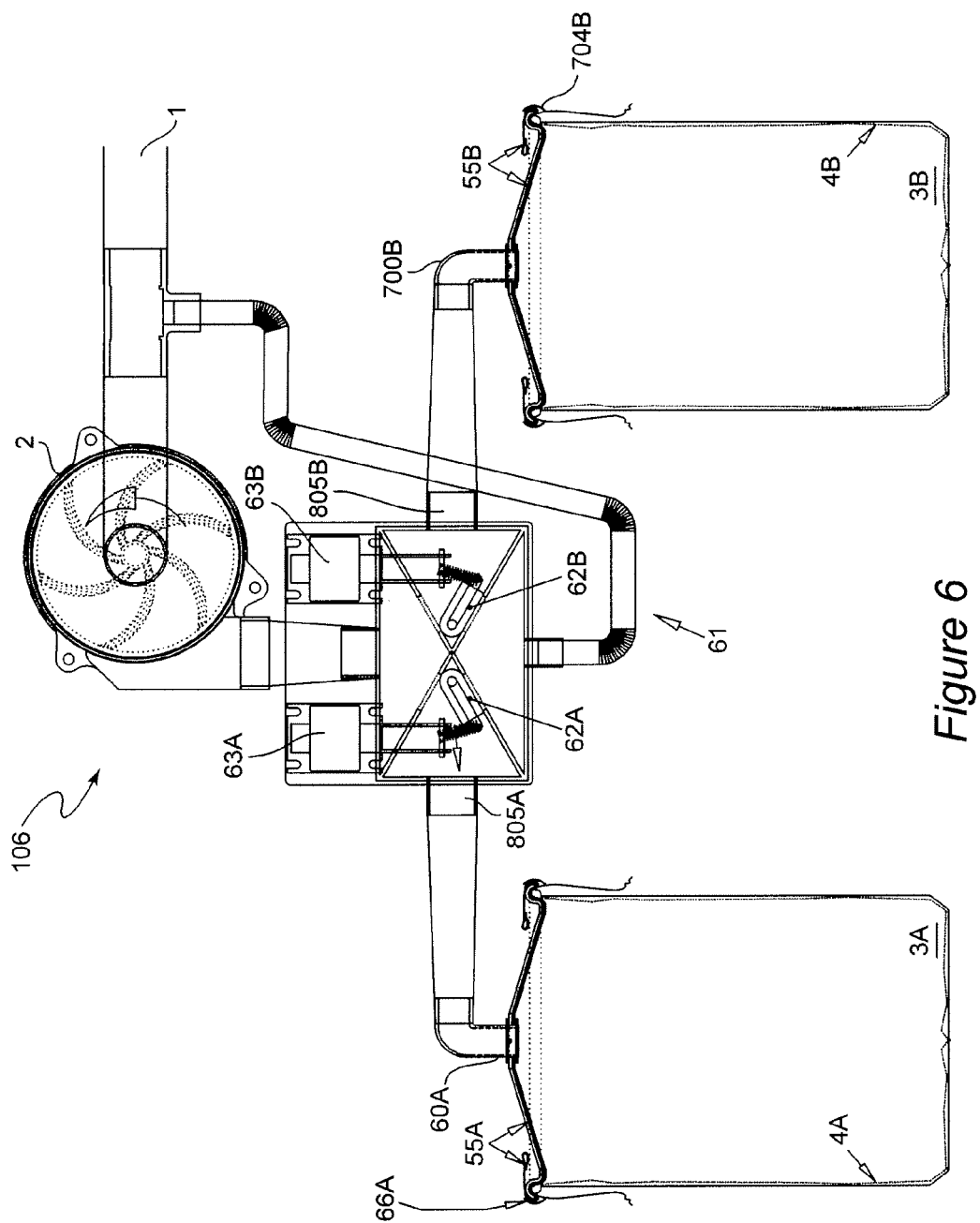
FIG. 6 is a cross-sectional view of an embodiment of another inventive vacuum cleaning system, in normal operation.

Referring to FIGS. 1 and 6, costly, space-consuming and complex bin extension rings (such as extension ring 7A in FIG. 1) may be eliminated as shown in FIG. 6 depicting bins 3A, 3B without bin extension rings (such as extension ring 7A in FIG. 1) and therefore simplified. FIG. 6 shows system 106 during normal operation. No bonnet is required in FIG. 6. A "dirty" vacuum source is assumed in FIG. 6. Bins 3A, 3B are pressurized in FIG. 6. In FIG. 6, dust-containing air enters suction inlet 1 as in FIG. 1 and travels to pump (vacuum source) 2 as in FIG. 1. In FIG. 6, the bin lid (and filter membrane 55A or 55B respectively) are penetrated from top center, through simple sealing hardware 60A, 60B. The normal bin lid is modified by cutting thereinto a hub-and-spoke pattern to allow air to flow through the membrane 55A, 55B, through the space between spokes, and out of the bin 3A, 3B to ambient. This spoke-modified bin lid (FIG. 6) is used to support the filter 55A membrane while under (normal operating) pressure from below.

Figure 7A:
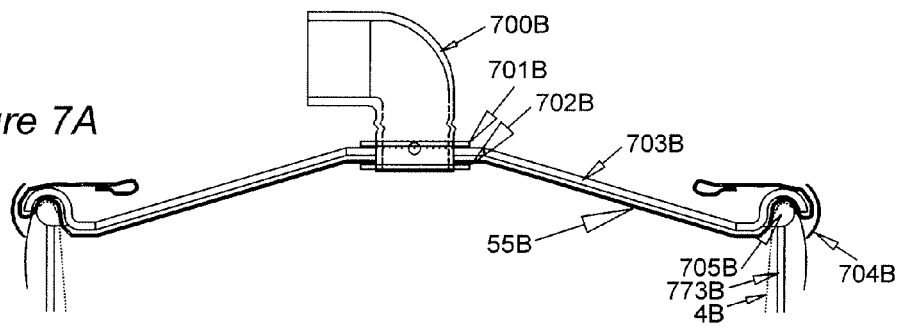
FIGS. 7A-7C are enlarged views cross-sectional views of drum membrane and lid details useable in the invention, referring to FIGS. 6-6A.

FIG. 7A shows an enlarged view of part of FIG. 6, during normal operation in which membrane 55B and its associated lid are inflated upwards, in a vicinity of bin nozzle 700B.

Through bin nozzle 700B (FIGS. 6, 7A), air travels towards bin 3B (FIG. 6). Washer seals 701B, 702B (FIG. 7) are provided where the bin nozzle 700B penetrates through the filter membrane 55B. The drum lid 703B is a spoked drum lid, optionally of flexible plastic. A spoked drum lid 703B as shown in FIG. 7D is preferred because it is easy to make by modifying an ordinary plastic drum lid, but it will be appreciated that a drum lid is not required to be spoked to be useable in the invention.

Again referring to FIG. 7A, clamp 704B clamps lid 703B, filter membrane 55B and optional liner 4B to the bin drum lip 705B near the wall 773B of the bin 3B. Filter membrane 55B preferably is a disk-shaped, floppy, surface-loading filter membrane with a peripheral hem, hole-punched in its center with said hole sized to tightly accommodate the nozzle 700B.

Figure 7B:
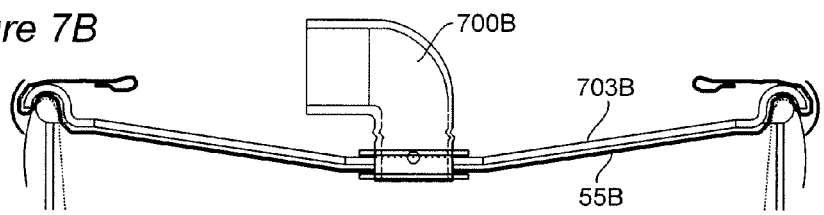

Referring to FIG. 7B, the filter membrane 55B and lid 703B of FIG. 7A (normal vacuuming operation) are shown during a cleaning operation. The filter membrane 55B and the lid 703B are sucked downwards by the vacuum existing in the bin below the membrane. Air is suctioned through the nozzle 700B and thus out of bin 3B.

Figure 7C:
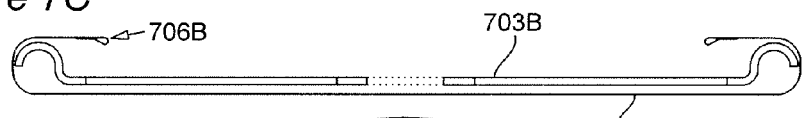
Figure 7D:
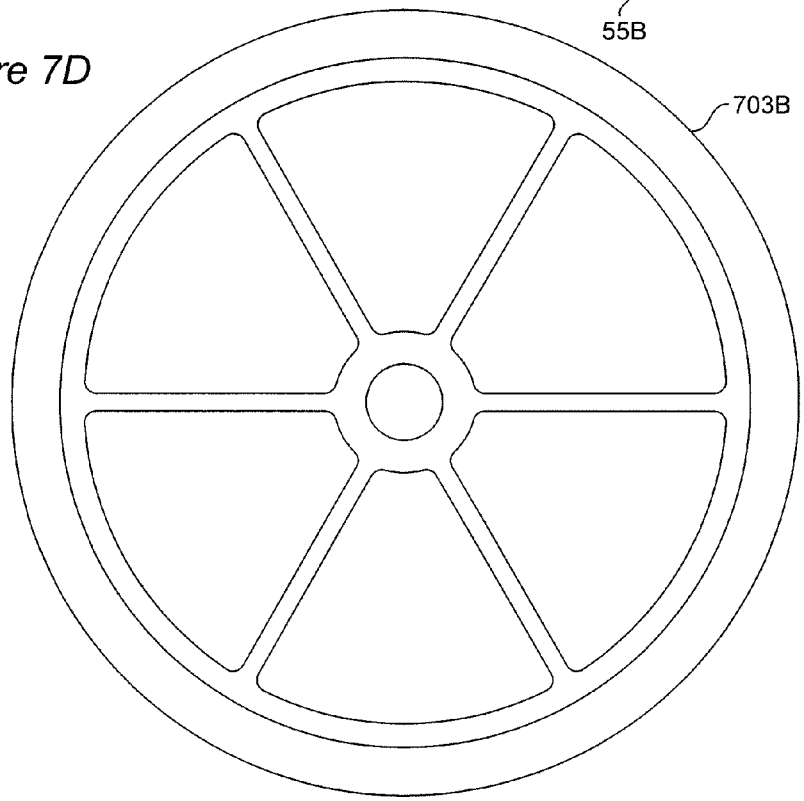
FIG. 7D is a top view of a spoked lid 703B useable in the invention, referring especially to FIG. 7A.

Referring to FIG. 7C, the filter membrane 55B and the lid 703B of FIGS. 7A-7B are shown when the system 106 is switched off. The filter membrane 55B and the lid 703B are relaxed. A drawstring or elastic band (preferably, an elastic band, not shown) is threaded or sewn all the way around or through the hem 706B of the membrane 55B. The elastic band at 706B is not very tight. The band retains the filter membrane 55B in proper location until the lid 703B is clamped to the drum lip 705B. If the filter membrane 55B (with elastic band or drawstring attached) were removed, it would resemble a large "shower cap".

In FIG. 6, clamp ring 66A holds and seals the filter 55A, liner 4A and top of the bin 3A. Vacuum return pipe 61 has no flow in normal operation. Dust-containing air that has traveled from the pump 2 passes through the open ports 802A, 802B (see FIG. 8A). Respective actuator 63A and actuator 63B are each in a relaxed mode blocking flow into return pipe 61 (FIG. 6). Filtered exhaust air exits through respective filters 55A, 55B to reach the environment outside the system 106 while dust remains in bins 3A, 3B.

Figure 6A:
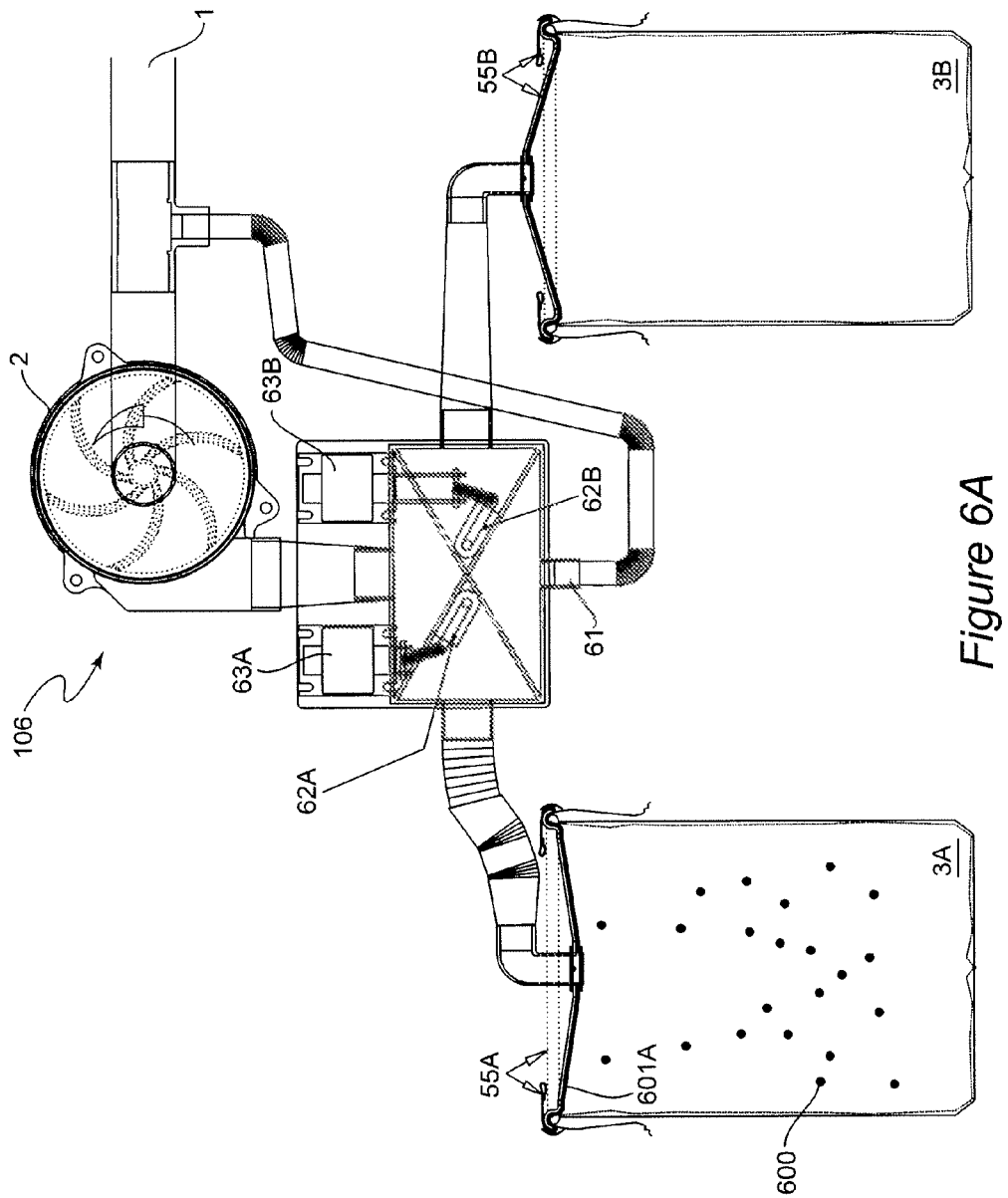
FIG. 6A shows self-cleaning of filter 55A from FIG. 6.

Cleaning Cycle, FIGS. 6 & 6A:

FIG. 6A illustrates cleaning filter 55A of system 106. Dust and air enter through inlet 1 and travel to pump 2 and upon exiting pump 2 travel toward and into bin 3B. Meanwhile air exits bin 3B via filter 55B so that filtered exhaust air is what departs bin 3B. Actuator 63A is pulling and actuator 63B is relaxed. Meanwhile outside air enters bin 3A of system 106 downwards through filter 55A. Dust-containing air exits bin 3A and travels through the X-valve via port 802X (FIG. 8A) toward and through the return pipe 61. After exiting the return pipe 61, the dust-containing from Bin 3A (FIG. 6A) air does not travel in the direction of the inlet 1 but rather is drawn into the pump 2 (along with dirty air from the external dirty-air source). During this operation in FIG. 6A of cleaning filter 55A, the vacuum unit 2 pulls dirty air from bin 3A, then pumps that air through the valve and into bin 3B. Meanwhile, the reversed air flow in FIG. 6A compared to the air flow in FIG. 6 causes caked dust 600 to fall from the underside 601A of filter 55A and towards the bottom of bin 3A.

The above principles for cleaning filter 55A likewise may be applied to clean filter 55B.

INVENTIVE EXAMPLE 1C

The system of FIGS. 6 & 6A is modified by omitting the trash bag liner. Bin 3A is emptied like an unlined trash Bin is emptied, which would be dusty but feasible in case of emergency such as lack of time to locate and load another trash bag, or if no bag is available at all. Advantageously, no bag is REQUIRED to operate this system. A disposable bag is MERELY DESIRABLE.

INVENTIVE EXAMPLE 2

In this inventive Example 2, a clean vacuum source is used with an evacuated Bin, which Bin must be sufficiently rigid to stand up to the vacuum, and thus maintain its shape. The vacuum forces are significant. The total force on the areas of the filter and Bin may be in the hundreds of pounds while pressurized at only ½ pound per square inch. Therefore round Bins are advantageously used to withstand the crushing forces. Typical operations are with 28 inches of water which is about 1 psi. If a filter area is 16 inches in diameter (i.e., radius=8 inches), this translates to 201 square inches. If 1 psi is applied, that means 202 pounds total force is applied on the lid alone. Therefore robust Bins are needed with either pressure or vacuum-applied directly to the Bins. Please note, however, that ordinary low-cost plastic-molded shop vacuum canisters routinely withstand such forces.

Figure 2:
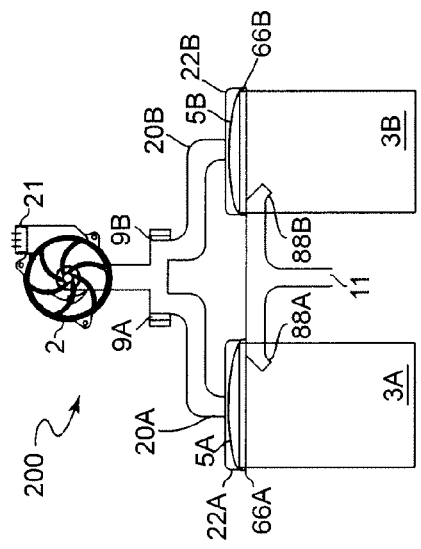
FIG. 2 illustrates a cross-sectional view of a second inventive embodiment in normal operation, for an embodiment operating with a "clean" vacuum source, wherein a bin is evacuated and is bonneted.

Referring to the inventive system 200 in FIG. 2, a clean vacuum source is used. The vacuum pump 2 must only encounter filtered air. Therefore air into the vacuum source (e.g., pump, bellows, impeller, a bellows-type air pump, positive displacement pump, etc.) must be clean. Therefore, the Bin must be evacuated through the filter and filtered air is thus drawn into the pump 2.

In system 200 (FIG. 2), dust-containing air enters through suction inlet 11. Dust travels through respective nozzles 88A, 88B into respective bins 3A, 3B.

The Bin 3A in FIG. 2 is penetrated with a nozzle 88A. Dust enters into bin 3A through nozzle 88A and clean air exits upwards via filter 5A. The filter 5A dome is clamped, and entirely enclosed within a bonnet 22A. (Unlike example 1, in which no bonnet is used.) Referring to FIG. 2, dust tends to fall in the bottom of bin 3A. In normal vacuuming operation, the filter 5A is domed upwards reacting to the air flowing upwards through it. The bonnet 22A (a metal or plastic outer shell) captures the air flow and channels it to the suction inlet of vacuum source 2. The clamp ring 66A clamps both the bonnet 22A and filter 5A to the Bin 3A. In system 200, bin 3B likewise has a bonnet 22B with associated clamp ring 66B. A sealed system is shown in FIG. 2 with pipes 20A, 20B through which filtered air exits the respective bins 3A, 3B and which goes to the vacuum source 2. Filtered air passes through the respective filter 5A or 5B, then passes by the respective blocked valve 9A or 9B. Filter exhaust air exits through exhaust port 21.

Figure 2A:
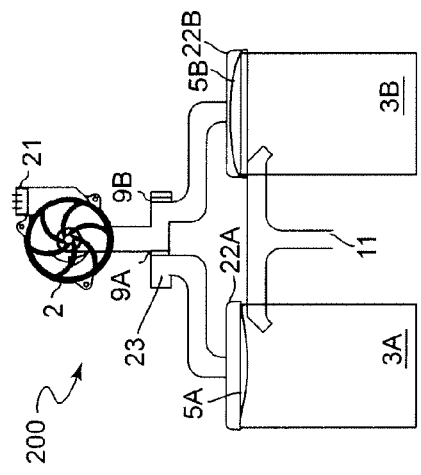
FIG. 2A illustrates cleaning of filter A for the system of FIG. 2.

CLEANING CYCLE for Filter 5A: With reference to FIG. 2A, to accomplish cleaning of filter 5A in system 200, Bin 3A's valve 9A connects Bin 3A's bonnet 22A to ambient air, while also closing off Bin 3A's bonnet 22A connection to the vacuum source 2. During this cycle of cleaning filter 5A, Bin 3B's bonnet 22B remains connected to the suction side of vacuum source 2. Bin 3A is still under vacuum, but the airflow through Filter 5A has reversed direction compared to normal vacuuming operation. The downward flowing air at Filter 5A flushes caked dust away from the underside of Filter 5A, and downwards into the bottom of Bin 3A. Outside air enters system 200 through opening 23 and is drawn through valve 9A and bonnet 22A and filter 5A, and into the top of Bin 3A. Bin 3A's air (with some dust) is now flowing into the vacuum suction port and thence is pumped into Bin 3B, along with dust and air from the main suction inlet 11. The combined air from BOTH Bin 3A and the main suction inlet 11 flows into Bin 3B. During this operation of cleaning filter 5A, dust tends to fall to the bottom of Bin 3B, and the dust-laden air is filtered through Filter 5B as it passes up into Bin 3B's bonnet 22B. The filtered air is drawn through valve 9B to the suction side of vacuum source 2, whence it is pumped to ambient via exhaust port 21. Therefore, during this cycle, Bin 3A's filter 5A is back-flushed into Bin 3A, and also partially into Bin 3B. During this operating of cleaning filter 5A, valve 9B is in its normal (rightmost) operating position. At the end of this cleaning cycle for Bin 3A's filter 5A, valve 9A returns to its normal-operating (leftmost) position.

In order to clean filter 5B, the above principles for cleaning filter 5A likewise may be applied: Valve 9A is left in its normal-operating (leftmost) position, and Valve 9B is moved left, so as to flush Bin 3B's cleaning air (via the pump 2) into Bin 3A. At the end of this cleaning cycle for Bin 3B's filter, valve 9B returns to its normal-operating (rightmost) position.

In FIGS. 2-2A, the valves 9A, 9B are actuated. Examples of valves 9A, 9B are, e.g., a classic slide valve, a rotary valve, a sliding valve, a flapper valve, etc. Blocking and unblocking of the valves 9A, 9B is accomplished via any of several simple means of actuation.

A vacuum system 200 according to this example 2 could be used, for example, with a destruction machine.

An inexpensive, but greatly improved workshop-type vacuum cleaner could be constructed according to this invention by dividing the volume of the usually-provided single chamber into two separate chambers, each topped by its own internally molded bonnet. A suitable and inexpensive manually operated valve could be provided with an actuating handle atop the unit to actuate the cleaning cycle as necessary.

INVENTIVE EXAMPLE 3

In this "clean-impeller" example, a disposable bag is provided inside a canister as shown in FIGS. 3-3A. The operation of the system 300 in Example 3 differs from that of system 200 in Example 2 in the following respects:

A) Bins 3A, 3B are each lined with an inexpensive disposable plastic bag PB.

B) Bins 3A, 3B are equipped with respective "open-style" mesh liners 51A, 51B. Each mesh liner 51A, 51B is rigid and is disposed between the plastic bag PB and the respective bin 30A, 30B, to help the vacuum keep the plastic bag PB against the respective bin 30A, 30B. A mesh liner 51A, 51B comprises, e.g., foam, fiberglass, etc., or other materials with enough rigidity to maintain shape but permit air to pass easily. The mesh liners 51A, 51B in FIGS. 3-3A are only encountering the clean air trapped between the bag's outer wall and the bin's inner wall. Optionally a bottom mesh liner (not shown) may be placed on the floor of the respective bins 30A, 30B which optional bottom mesh liner may be, e.g., formed into a mesh basket integral with the mesh liner 51A or 51B that lines the sidewalls of the bins 30A, 30B or may be a separate piece not integral with the mesh liners 51A or 51B.

C) Bins 3A, 3B are equipped with bag-inflation pipes 30A, 30B to cooperate with the mesh liners 51A, 51B. Evacuation of air through bag-inflation pipes 30A, 30B causes plastic bags PB to stay inflated during normal vacuuming operation.

Vacuum levels within this system are as follows:

$Vac_A$ occurs at vacuum motor's suction inlet. It is the most intense vacuum.

$Vac_B$ occurs at T-junction above the valves 99A, 99B (FIG. 3). It is less intense than $vac_A$.

$Vac_C$ is the normal vacuum level occurring in the bins. It is less intense than $vac_B$.

$Vac_D$ occurs at dust inlet 31 in FIG. 3. It is the least-intense vacuum.

The bag-inflation pipes 30A, 30B (FIG. 3) are smaller in diameter relative to the dust-carrying pipes (like connection 33A). In the smaller-diameter, bag-inflation pipe 30A, 30B, the vacuum level is almost identical to $vac_B$, because there is almost no air flow in the inflation pipe 30A, 30B, once the system has been operating for a brief stabilizing interval (to evacuate the space between the Bin 3A, 3B walls and the bag PB walls). The changes in vacuum level are not linear, but rather are along a gradient. The vacuum level is down to $vac_D$ where dust and air enter into the system at 31 (FIG. 3). In FIG. 3, $vac_C$ is greater than $vac_D$ meaning that more vacuum exists at point C than at point D. In constructing a system 300 according to FIG. 3, the vacuum motor's controller (not shown) should be set for adequate performance at $vac_D$ (dust entry point 31), depending on overall system requirements. In FIG. 3, during normal operation of system 300, suction to ambient is blocked in areas 99A, 99B.

In FIG. 3, a container within a container is provided, namely, respective rigid exterior walls which belong to Bin 3A or 3B, within which are mesh walls 51A, 51B.

In FIG. 3, a plastic bag PB is disposed within a canister or bin 3A, 3B. The relatively small volume between the plastic bag PB and the inside wall of the container 3A, 3B is evacuated. The plastic bag PB is sucked against the mesh 51A, 51B and the plastic bag PB is kept "expanded" against the inner walls of the mesh 51A, 51B.

Two seal points are shown in FIG. 3. Around the lower seal point is a clamp ring 36A. A bonnet 32A and extension ring 39A are associated with the bin 3A (FIG. 3). The upper clamp ring 38A clamps the bonnet 32A and filter 35A to the extension ring 39A's upper outer wall. The clamp 38A ring also clamps the extension ring 39A's lower outer wall and the plastic bag PB to the outer wall of the Bin 3A. The mesh liner 51 is located between the plastic bag PB and the wall of the Bin 3A. Air is evacuated from this small-volume space (where the mesh liner 51 is located) by the small bag-inflation pipe 30A to the relatively higher vacuum source, $vac_B$. The vacuum at $vac_B$, which is within small bag-inflation pipe 30A is always greater in normal vacuuming operation (FIG. 3) than at $vac_D$ which is at the suction inlet 31. It is also greater than $vac_C$ which is the suction level within the bins. Dust and air enter the system 300 through suction inlet 31. Dust that has entered the system 300 via suction inlet 31 travels toward and into bins 31A or 31B during normal vacuuming operation (FIG. 3).

The bonnet 32A has a connection 33A (larger pipe) to $VAC_C$ to cause the filtered air that has exited from bin 3A and has passed through filter 35A to travel through pump 2 and to be evacuated from the system 300 via exhaust port 321. Within the vacuum pump 2, the vacuum level at the suction side is $vac_A$ which is a relative maximum vacuum amount for the system 300, $vac_A = vac_{max}$. Near the vacuum pump 2 where filtered air from both of filters 35A and 35B is traveling into the vacuum pump 2, the vacuum level $vac_B$ is somewhat less than $vac_{max}$.

The purpose of the extension ring 39A is to avoid penetrating the plastic bag PB's wall with the inlet 311. FIG. 3 shows one possible alternative arrangement for the placement of mesh, without the invention being limited to such a placement of mesh. For example, another option is to include mesh also at the bottom.

In FIG. 3, the vacuum source 2 is shown. The vacuum suction side is connected to the bag-inflation pipes 30A, 30B, which causes the bag-inflation pipes 30A, 30B to have the greatest vacuum available in the system. The vacuum level between the wall of the respective bin 3A, 3B and the plastic bag PB is thus greater than the vacuum level $vac_C$ within the bag PB. If there were significant flow within the bag-inflation pipes 30A, 30B, this might not be true. Once the mesh cylindrical space 51 has been evacuated, however, there is no significant flow in the bag-inflation pipes 30A, 30B, and the higher vacuum available at $vac_B$ maintains the differential pressure needed to keep the bags PB expanded.

It is considered necessary to force each plastic bag PB to stay expanded. The structure in FIG. 3 forces a plastic bag PB to stay expanded. To dispose a basket inside a plastic bag PB has been rejected because such an inside-the-bag basket would have to be removed when the bag was to be emptied, which would be messy and inconvenient. The inventor therefore considers that the plastic bag PB should be kept expanded without relying on a basket or object inside the plastic bag PB.

Referring to FIG. 3, the lowest vacuum point is still a very significant vacuum level. A small (~10%) differential exists between the bag-inflation vacuum level ($vac_B$) and the bin vacuum level (approximately $vac_C$). For proper functioning, a small differential is maintained between the bag-inflation-pipe 30A, 30B vacuum level and the bin 3A, 3B's interior vacuum level, i.e., at least a pressure differential of 1" of water.

In FIG. 3, the mesh 51A, 51B on the sides is necessary to keep vacuum force on the plastic bag PB evenly distributed. Preferably, although not shown on FIG. 3, optional mesh at the bottom of the bins 3A, 3B is also included. If only a single port or a few pipes were to be used for this purpose (as in attempts in the prior art), the plastic bag would get sucked into the port or pipe openings, block the vacuum, and prevent complete bag inflation.

Referring to FIG. 3, in normal operation, waste travels into both Bin 3A and Bin 3B at once. Referring to bin 3A by way of example, air is sucked through the filter 35A which is trapped between the bonnet 32A and the top of the extension ring 39A, which is in turn clamped to the top of the Bin 3A. Dust is not evacuated through the bonnet 32A' top port due to being stopped by the filter 3A. Meanwhile, a slightly stronger vacuum level $vac_B$ is also used to keep the plastic bag PB expanded.

The cylindrical volume between the Bin 3A or 3B's wall and its plastic bag PB is occupied by the mesh 51A or 51B to provide an evenly distributed area of suction between the inside wall of the Bin 3A or 3B and the outside wall of the plastic bag PB.

In FIG. 3, separate evacuation schemes are shown in which Bin 3A and Bin 3B are twins. Two Bins 3A, 3B are used in order to provide self-cleaning of the filters 35A, 35B, and to divide the output load so that when the plastic bags PB are light-gauge plastic bags the plastic bags pB do not get so heavy as to be break easily or to be too difficult to lift out of the Bins 3A, 3B. Referring to FIG. 3, air is sucked out because the bonnet 32A is sealed around the filter 35A. The stronger vacuum from the higher vacuum ($vac_B$) source point keeps the bag PB expanded.

In normal vacuuming operation (FIG. 3), valves 99A, 99B are maintained in the positions indicated in FIG. 3.

CLEANING CYCLE OF FILTER 35A: With reference to FIG. 3A, to accomplish cleaning of filter 35A, valve 99A is mode to the rightmost position and connects bonnet 32A to ambient air, while also closing off Bin 3A's bonnet 32A connection to the vacuum source 2. Valve 99B remains in its normal rightmost position (FIG. 3A). During this cycle of cleaning filter 35A (FIG. 3A), bonnet 32B remains connected to the vacuum source 2. Bin 3A is still under vacuum, but the airflow through Filter 35A has reversed direction (FIG. 3A) compared to direction in normal vacuuming operation (FIG. 3). The downward flowing air at Filter 35A (FIG. 3A) flushes dust away from the underside of Filter 35A, and downwards into the bottom of Bin 3A. Thus, outside air is drawn through valve 99A, through bonnet 32A and filter 35A, and into the top of Bin 3A. This air (with some dust) flows into Bin 3B, along with dust and air from the main suction inlet 31. The combined air from BOTH Bin 3A and the main suction inlet 31 flows into Bin 3B. Dust tends to fall to the bottom of Bin 3B, and the dust-laden air is filtered through filter 35B as it passes up into Bin 3B's bonnet 32B. The filtered air is drawn through Valve 99B (in rightmost, normal position) to the vacuum source 2, then pumped out of exhaust port 321 to ambient. During this cycle of cleaning filter 35A, Bin 3A's filter 35A is back-flushed into Bin 3A, and also partially into Bin 3B.

It will be appreciated that filter 35B may be self-cleaned by applying the principles shown in FIG. 3A but reversing the process shown in FIG. 3A.

EXAMPLE 3.1

An inexpensive inventive workshop-type, "clean-impeller" vacuum cleaner is constructed by dividing the volume of what in the conventional workshop-type vacuum cleaner is a single chamber into two separate chambers (such as bins 3A, 3B in FIGS. 3-3A). In FIG. 3, bonnets 32A, 32B are provided but the two bonnets 32A, 32B (FIG. 3) are molded into a single upper plastic bonnet structure. An inexpensive manually operated valve is provided with an actuating handle (preferably atop the vacuum cleaner unit) to actuate the filter-cleaning cycle as necessary.

INVENTIVE EXAMPLE 3A

The system in FIG. 3 can be modified (if necessary) to install two shut-off valves (located on the bag-inflation pipes 30A, 30B) so as to not require using a plastic bag PB.

INVENTIVE EXAMPLE 4

Referring to FIG. 4, Bin 33B is much smaller than bin 3A and filter 45B is much smaller than filter 45A. In normal operation (FIG. 4), dust and air enter via the suction inlet 41, pass through the impeller system 2, and are pumped into Bin 3A only. Bin 3A preferably is lined with an optional plastic bag PB such as a trash bag liner; bin 33B preferably is lined with an optional liner (not shown). Bin 3A is also referred to as the primary bin. In normal vacuuming operation (FIG. 4), bin 33B is double blocked by valves 499 and 499B. In normal operation (FIG. 4), bin 33B does not encounter EITHER pressurized dirty air, OR suction from the vacuum source 2, because pipe 499C is blocked. Valve 499B in FIG. 4 may be selected from the same types of valves as valve 9B (FIGS. 1, 2) and valve 99B (FIG. 3).

The incorporation of valve 499 makes the use of a very small "auxiliary" filter 45B more practicable. Those skilled in the art will appreciate that all three of these simple valve structures 499A, 499, 499B could be integrated into a simple and inexpensive valve assembly.

In FIG. 4, the dirt and dirty air can only enter bin 3A, and are blocked from going into Bin 33B. There is no flow in Bin 33B in FIG. 4 in normal operation. Filtered exhaust air exits bin 3A to ambient via filter 45A. Suction is blocked in pipes 43A, 43B by the valves.

CLEANING CYCLE: Referring to FIG. 4A, to clean filter 45A (of bin 3A), filter cleaning air is caused to pass from the outside environment through filter 45A as follows: Valve 499A (e.g., a slide valve, a butterfly valve, etc.) is moved to its alternate "cleaning", right-most position. The pipe 43A from bin 3A, which was pressurized with dirty air in normal operation (FIG. 4), is now in FIG. 4A connected to the suction side of the vacuum source 2, and is now operating under vacuum. Bin 3A is thus drawing outside air downwards through its filter 45A, into Bin A, (and now dirty) out through the pipe 43A and into the vacuum source 2. Dirty air from the normal dirty-air source air is also being drawn into the vacuum source 2 from inlet 41. Downward deflection of filter 45A occurs as a reaction to the reversed airflow in FIG. 4A compared to FIG. 4, and filter 45B deflects upward (FIG. 4A), reacting to the pressure in bin 33B. Filtered exhaust air exits the system 400 to ambient via filter 45B.

Because the airflow through filter 45A is now reversed in FIG. 4A compared to FIG. 4, dust caked on the underside of filter 45A is now flushed downwards by this reversed airflow (FIG. 4A). Valve 499B is in its normal, closed, regular operating position.

Meanwhile, the middle valve 499 (illustrated here as a butterfly or flapper valve but without the invention or this example being limited to such valves) has opened a passage for pressurized dirty air (from Bin 3A's filter 45A and also from the main dust and suction inlet 41) to flow into bin 33B. Thus bin 3A's filter 45A is cleaned into bin 33B. In FIG. 4A, suction is blocked in pipe 43B. There is no air flow in pipe 43B.

To clean filter 45B of bin 33B, the scheme of FIG. 4A is simply reversed. Valve 499A is returned to its leftmost, normal operating position. Valve 499B (e.g., a slide valve, a butterfly valve, etc.) is moved to its alternate "cleaning" (open) position. The pipe 43B from bin 33B, which was pressurized with dirty air in normal operation (FIG. 4), is connected to the suction side of the vacuum source 2, and operates under vacuum. The vacuum draws in outside air through filter 45B, via pipe 43B. Downward deflection of Filter 45B occurs, reacting to the reversed airflow, and filter 45A deflects upward, reacting to the pressure in bin 3A. Because the airflow through filter 45B is reversed, dust caked on the underside of filter 45B is flushed downwards by this reversed airflow. Valve 499A remains in its normal, leftmost, regular operating position (FIG. 4). The middle valve 499 is closed to direct the pressurized dirty air (from bin 33B's filter 45B and also from the main dust and suction inlet 41) to flow via pump 2 into bin 3A. Thus bin 33B's filter 45B is cleaned into bin 3A.

In this inventive example, bin 33B's whole purpose is to clean bin 3A's filter 45A. Because bin 33B is not intended to be a waste-collection bin, bin 33B can be made greatly smaller than bin 3A. The self-cleaning of bin 3A, 33B is inventive. The concept of this example in which bin 33B is smaller may be applied to above Examples 1-3, that is, in those examples, too, one bin could be smaller than the other bin.

The vacuum system 400 of this example may be used, e.g., in a grubby commercial environment such as where a workshop vacuum is used. Vacuum system 400 also can be miniaturized, and also integrated into a single compact unit.

INVENTIVE EXAMPLE 5

Plastic Bag

Figure 5:
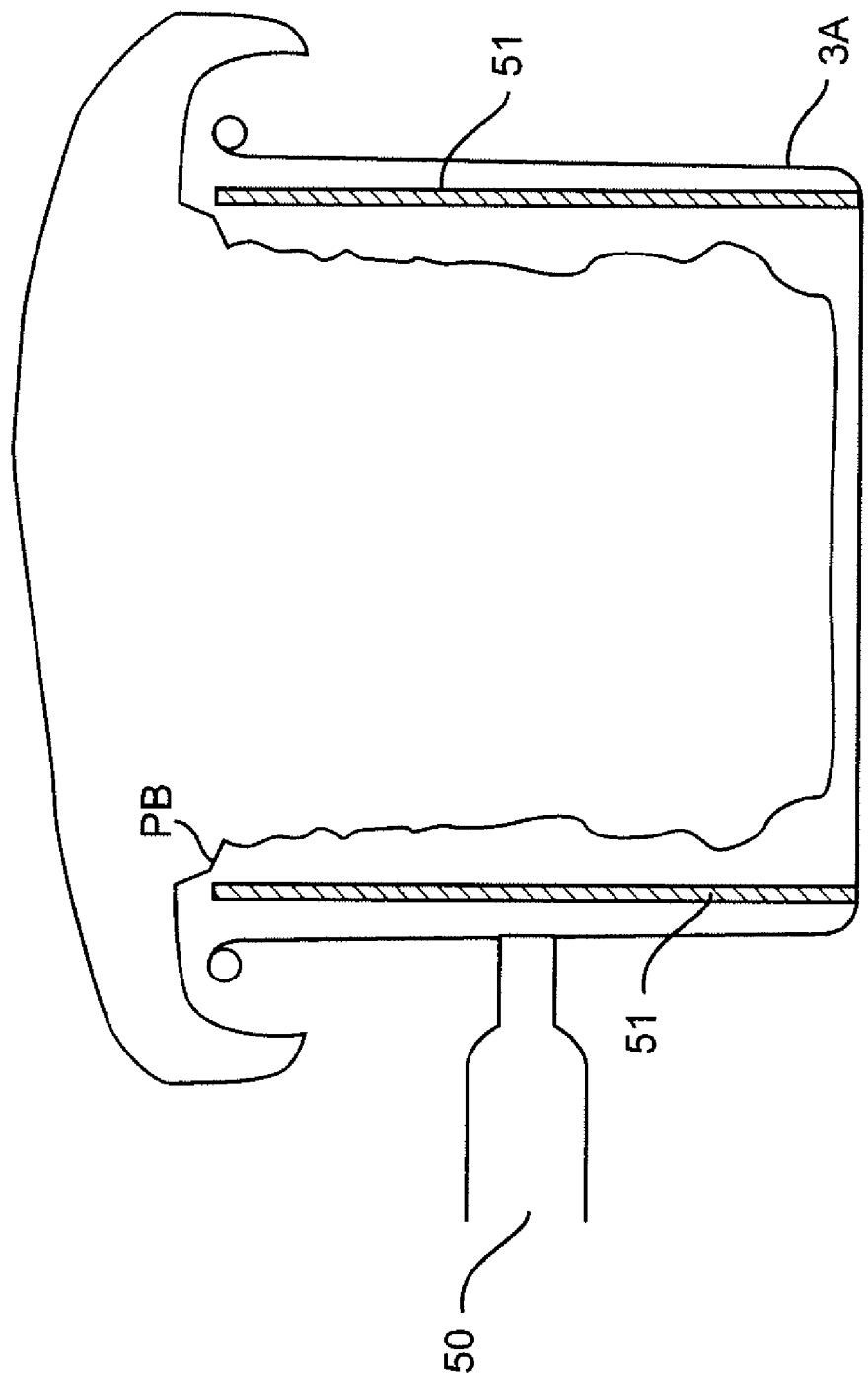
FIG. 5 is a cross-sectional view of an inventive vacuum cleaner system in which an ordinary plastic bag (PB) is used.

Although the invention does not in every embodiment require the use of a plastic bag, advantageously the invention may be practiced in a vacuum cleaner application using an ordinary plastic bag PB (FIG. 5), which is a further advantage provided by the invention. An even further advantage is that the plastic bag PB requires no insert (to keep the plastic bag expanded) and need not have holes (other than the one normal top opening). Through vacuum port 50 air may be withdrawn to create a vacuum within bin 3A (in the space between the outside wall of the bag and the inside wall of the bin). FIG. 5 illustrates when a vacuum status is not yet occurring through vacuum port 50. Within the bin 3A are disposed mesh walls 51. During normal vacuuming operation, the plastic bag PB is maintained against the mesh walls 51 via differential pressure comprising greater vacuum suction to hold the plastic bag PB against the bin wall than to pull in the debris. Examples of differential pressure comprising greater vacuum suction to bag-hold than to debris-pull are, e.g., using a separate vacuum pump to maintain the expanded plastic bag against the mesh wall (which is interposed between the plastic bag and the rigid canister wall); using bleed vacuum from the primary vacuum source (as indicated in the preferred embodiments above for reasons of economy and simplicity), such that the bleed vacuum is stronger than the regular vacuum, and thus keeping the bag expanded. In the inventive vacuum cleaners, no coiled flat spring or other mechanical structure is needed for holding the plastic bag PB mesh walls 51 anywhere.

A vacuum cleaner may be operated using an ordinary plastic bag to collect waste according to any of FIGS. 1, 2, 3, 4 discussed above. However, it should be appreciated that Applicant's principle of using differential pressure for expanding the plastic bag may be applied in other designs and systems besides those of FIGS. 1, 2, 3, 4.

EXAMPLE 5A

Integrated-Mesh Bin Construction

A vacuum cleaner is constructed in the manner of Example 5, with the further refinement of molding the open-mesh structure into the bin during original forming, molding, or manufacture of the bin itself. This mesh could be as simple as molding a multitude of tiny projections or ventilated ribs on the bin interior walls, each projection or rib facing towards the central axis of the bin.

EXAMPLE 6

Required Filter Area Reduced

A conventional 6-gallon vacuum cleaner requires a relatively big bag to act both as filter and disposal bag; this is due in large part to the loss of filter area that occurs as the bag fills and piled-up debris prevents air passage to the bag walls; the bag must normally be constructed of filtration paper, which is more costly than thin plastic.

Because the inventive filter(s) are self-cleaned as necessary, and are not blocked by debris piled up against them, the filtration area required is greatly reduced, and thus the overall filter expense is greatly reduced by using the invention.

In a conventional shop-type vacuum unit, the filter area has to be large enough to allow operation without clogging (further exacerbated by debris pile-up) until the bag is full. Further, in conventional units, the entire bag must be made of filter material and filter cost is thus much greater in conventional units.

To solve these problems and disadvantages associated with conventional systems, the inventor has constructed an inventive system such that 4-5 times as many square inches of total bag area are needed for a conventional vacuum cleaner compared to the inventive 15-gallon system that he built.

EXAMPLE 6A

Greater Volumetric Efficiency

A conventional 6-gallon vacuum cleaner's bag cannot really hold six gallons, because the bag would so tightly fill the space within the canister as to be almost impossible to remove without breakage. Further, the bag cannot EVER be completely filled, regardless of size, because it will gradually lose filter area as it is filled. When it is 100% filled, it will have ZERO free filter area remaining. There would then be almost no air flow, and thus no vacuuming action. At 75% or so of available volume capacity, a conventional system is full.

In contrast, the inventive systems described herein allow for filling right up to the filter membrane, before air flow is blocked by debris. The resulting 6-gallon vacuum really holds 6 gallons, not the 4.5 gallons or so of a conventional 6-gallon vacuum.

EXAMPLE 7

Filter Size

The inventor defines a relative filter size in terms of filter area required per cubic foot of filtered volume. A conventional sanding machine filter has a filter area per cubic foot of filter volume in an amount of 100 filter area units/waste gallon compared to 10 filter area units/waste gallon for an inventive filter (because the inventive filter can be repeatedly cleaned as necessary without stopping vacuuming operations).

EXAMPLE 8

Filter Cost of Ownership

A conventional shop-type vacuum uses disposable filter bags or filter elements in at least two ways:
1) A smaller filter bag, secured over an inlet frame or screen connected to the vacuum source. In such a system, the vacuum motor draws air and debris into the canister. Debris tends to fall to the bottom of the canister. Debris-laden air is filtered by the filter bag or filter element covering the inlet screen, drawn through the "clean-type" vacuum impeller, and exhausted as clean air to the environment.
2) A much larger filter bag lines the canister, and is connected, using a "bag collar" to the debris hose. Debris-laden air flows into the filter bag. Filtered air is then drawn through pores of the filter bag and into the "clean-type" vacuum impeller, and exhausted as clean air to the environment.

In both of these conventional cases, the filter bag or filter element is a consumable item, which must be routinely replaced, resulting in a considerable long-term cost-of-ownership. (In some cases a foam-type filter element can be washed, but must still be covered with a disposable filter bag.)

In contrast, the inventive systems described herein use a permanent filter material, which can be re-used indefinitely. This improvement to the art results in a considerable reduction in the long-term cost-of-ownership.

A conventional paper filter or filter bag is usually destroyed (torn or disintegrated) by exposure to water, especially if the vacuum unit is actually operating at time of exposure. Advantageously, the inventive filter is not damaged if accidentally exposed to vacuumed water because it uses a fabric material that tolerates water. The fabric is actually washable.

EXAMPLE 9

X-Valve

In inventive vacuuming systems such as, e.g., system 106 (FIG. 6), preferably instead of a conventional valve there is used an inventive X-valve assembly 800 (FIG. 8A) which has the advantage of being self-cleaning. X-valve assembly 800 includes plates arranged in an X-structure 801. In the X-structure 801 are formed ports 802A, 802B, 802X, 802Y. The ports 802A, 802B, 802X, 802Y preferably are rectangular in shape for simplicity of construction and preferably are the same shape. In FIG. 8A, actuators 803A, 803B are each relaxed. Actuator 803A operates vane 62A; actuator 803B operates vane 62B. Examples of an actuator that may be used as actuator 803A, 803B is, e.g., a commercially available actuator such as, e.g., an inexpensive commercially available Dormeyer brand solenoid (or equivalent). For an example of a vane useable as vanes 62A, 62B, see Example 9A hereinbelow.

The X-structure 801 was constructed by the inventor and was not previously commercially available. An X-plate 1101 is shown laid out in flat in FIG. 11. An X-structure 801 (FIG. 8A) comprises two identical X-plates 1101 (FIG. 11). The notch 1102 in X-plate 1101 allows two identical X-plates 1101 to be nested together at the center to form an "X" within the shell 806 (FIGS. 8A, 12). The notch 1101 (FIG. 8A) aligns with the X 808 (FIG. 8A). The X-plate has ports 1103A and 1103B which preferably are rectangular as shown. Depending on which position in the X-structure 801 a constructed X-plate 1101 occupies, ports 1103A, 1103B will either correspond to ports 802A, 802Y or to ports 802X, 802B. In the constructed example, the X-plate had a length of 7.4" and a height 1104 of 2"; the notch 1102 had a depth of 1" and a width of 0.15". In the constructed example, the dimensions of the ports 1103A, 1103B were 1" by 1.5". The X-plate 1101 (FIG. 11) and the shell 806 (FIGS. 8A, 12) may be made separately or may be molded as a unitary piece.

In the X-valve assembly 800 (FIG. 8A), the X-structure 801 is disposed with its respective smaller angles each respectively facing bin ports 805A, 805B. Bin port 805A communicates with bin 3A (FIGS. 6-6A); bin port 805B communicates with bin 3B (FIGS. 6-6A). X-structure 801 and vanes 62A, 62B are housed within shell 806. Top plate 888 holds the solenoids (803A&B) and forms the top surface of the entire assembly 800. The underside of top plate 888 has grooves (not shown) that hold the X-structure 801 in position and seal for air leaks. Top plate 888 may be made of, e.g., Lexan, so that the valve assembly may be inspected and flow of material observed. A bottom plate (not shown in FIG. 8A) is similarly grooved to position and seal the X-structure 801; the bottom plate may be, e.g., just slightly larger than the outline of the top plate 888, and has no projection (for the solenoids) like the top plate 888 does. Four screws go through the entire assembly 800 between top plate 888 and bottom plate (not shown), forming a sandwich. X-structure 801 is joined securely to, and may be formed integral with, shell 806. Respective plenums 807A, 807B (FIG. 8A) are non-vacuum spaces. Each plenum 807A, 807B is bounded on three sides two of which belong to the X-structure 801 and the third side belonging to the shell 806. The respective vanes 62A, 62B (FIG. 8B) are joined to respective springs 802A, 802B via which the vanes 62A, 62B are actuated by respective actuators 803A, 803B. In FIG. 8A, where actuators 803A, 803B are relaxed, vanes 62A,

62B are in a position closest to the X 808 of the X-structure 801. (Vanes are positioned for normal operation.) The vanes 62A, 62B are capable, when actuated, of swinging so as to open or close their respective ports 802A/802X and 802B/802Y. See FIG. 9A through FIG. 9D.

Inlet plenum 809 (FIG. 8A) is disposed within the shell 806 in a vicinity of the inlet port 810. Inlet port 810 is a tubular connection to the inlet plenum 809. Opposite inlet port 810 is disposed tubular vacuum port 812, which communicates with vacuum plenum 811 within the shell 806.

Shell 806 (FIGS. 8A, 12) has opening 1810 which receives the inlet port 810; opening 1812 which receives the vacuum port 812; and openings 1805A, 1805B which respectively receive the bin ports 1805A, 1805B.

Figure 8B:
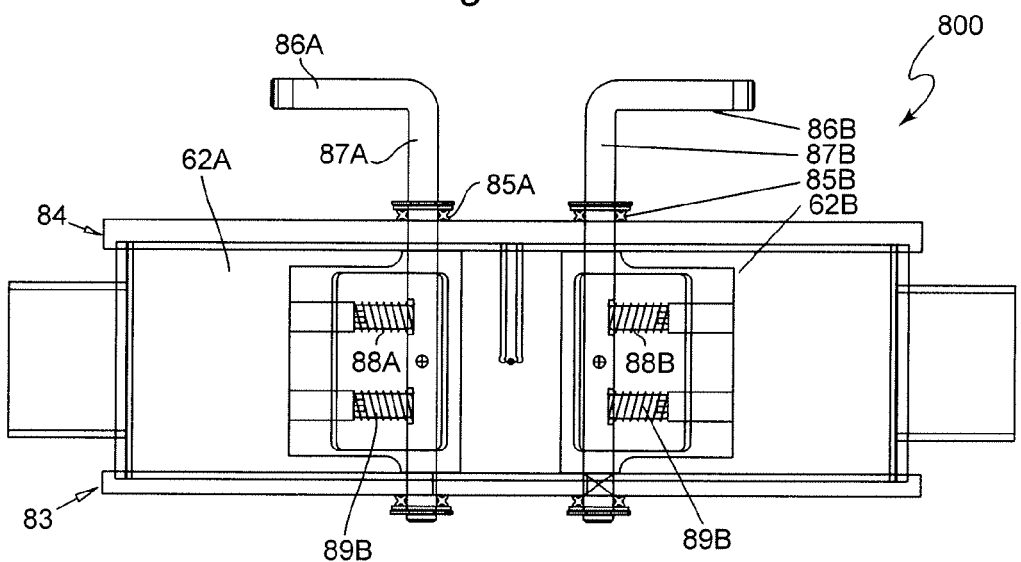

Referring to FIG. 8B showing X-valve assembly 800 in front elevation view, inlet port 810, vacuum port 812 and actuators 803A, 803B (FIG. 8A) are omitted for simplicity. Vane 62A is secured by set screws 88A, 89A to the vane shaft 87A; vane 62B is secured by set screws 88B, 89B to the vane shaft 87B. Vane shaft 87A comprises vane arm 86A; vane shaft 87B comprises vane arm 86B. Optional dust seals 85A, 85B surrounds respective vane shafts 87A, 87B where respective vane shafts 87A, 87B pass through the top valve cover plate 84 and bottom cover plate 83. The vanes 62A, 62B are situated atop bottom valve cover plate 83.

Figure 9A:
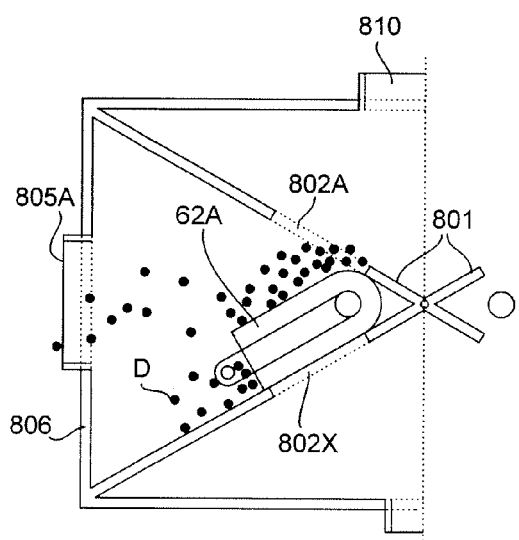
FIGS. 9A-9D show the structure of FIG. 8A in operation and show self-cleaning valve action.

Referring to FIGS. 9A-9D, the X-structure 801 and vane 62A of FIG. 8A are shown, this time in operation, demonstrating self-cleaning valve action, with the illustration relating particularly to filter 55A. FIG. 9A shows the vane 62A of FIG. 8A at 0 degrees which is the normal operating position. Dusty air including dust D enters through the inlet port 810 and travels in a direction of and through port 802A followed by exiting bin port 805A. Dust D exits via the bin port 805A and some dust D may remain in a vicinity of the vane 62A. In FIG. 9A, there is no flow of air or dust at port 802X.

Figure 9B:
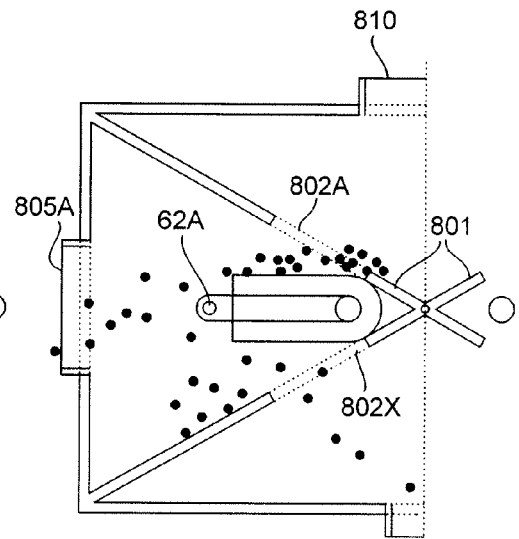

The vane 62A is actuated from its zero-degree position (FIG. 9A) and FIG. 9B shows the vane 62A at 30 degrees, which is midway through its rapid actuation travel. The total actuation travel time is typically under 1/30 of a second. Dusty air enters via inlet port 810 and travels in a direction of and through port 802A followed by exiting bin port 805A. Dust and air also exit via port 802X.

Figure 9C:
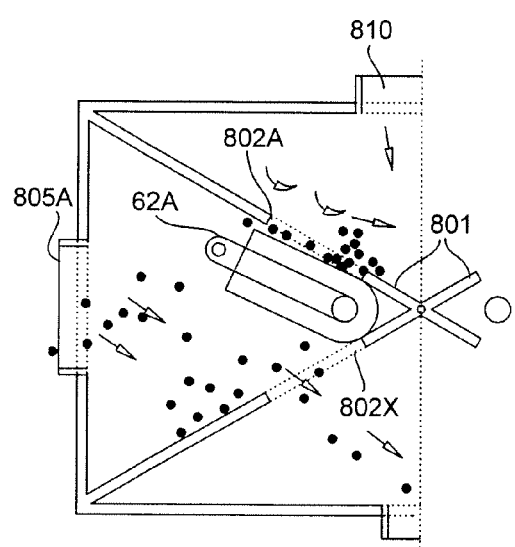

The vane 62A is further actuated and FIG. 9C shows the vane 62A at 55 degrees. Dusty air enters via inlet port 810. Air flow into port 802A is substantially blocked. Dust and air travel from outside the shell 806 through the bin port 805A and in a direction towards and through port 802X. The arrows → in FIG. 9C show air and dust flow direction.

Figure 9D:
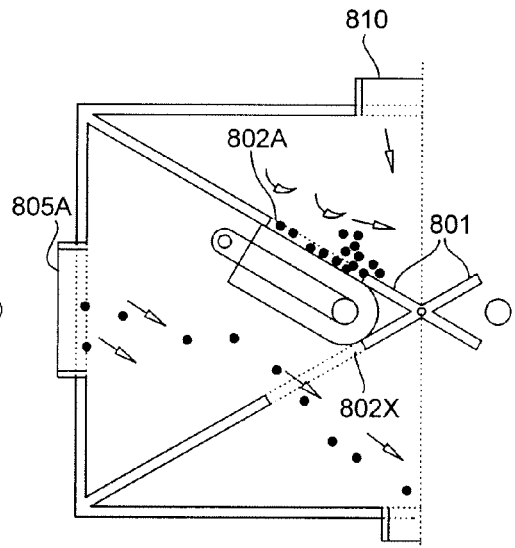

Vane 62A is further actuated and FIG. 9D shows the vane 62A at 60 degrees which is the fully closed position. In FIG. 9D, some dust is entering via bin port 805A inside shell 806 and exiting via port 802X, but mostly air is following that path. When vane 62A is actuated to the closed position (FIG. 9D), filter 55A is being cleaned by reversed (back-flushing) air flow.

The vane 62A (FIGS. 8A, 9A-9D) has a pivot end which is the end of the vane 62A nearest the X 808 of the X-structure 801. At its pivot end the vane 62A has a rounded edge. The rounded edge of the vane 62A closely wipes (but does not strongly scrape against) against the edge of the X-plate port 802A, keeping the X-assembly 800 free of obstruction. As the vane 62A closes (i.e., moves into the 60 degree position) in FIGS. 9B-9D, flat and rounded surfaces of the vane 62A push debris back into the inlet plenum 809 (FIG. 8A). Air flow assists in clearing debris from the vane 62A and edges of the port 802A during vane 62A closure. The action of the vane 62A is preferably rapid (such as, e.g., 0.02-0.3 seconds) for best efficiency, but is not required to be as rapid as slamming a door.

Rubber seals can be added to the vanes 62A, 62B, but if the X-valve assembly 800 is carefully constructed, leakage is negligible and can usually be ignored, at least in normal dust-handling applications). Vanes 62A, 62B can be spring-returned or actuator-forced back to a normal operating position. In the inventive models constructed, it has been found that the simplest and most economical construction is to make the vanes just a tiny amount larger than their respective ports, so that debris cannot block the vane from closing against the port. Rather, debris is simply brushed aside or slightly displaced by the closing vane, thus making for an effective but debris-tolerant closure that does not jam or cause the vane to stick partially open.

The vane 62A, 62B is held closed just by the operating vacuum level, and uses a very-low-force return spring to help start the vane 62A, 62B moving towards a closed position, where the vacuum force then completes the closing action. Therefore only relatively weak vacuum forces need be overcome to open the vane 62A, 62B. Thus a small, low-force, inexpensive solenoid can be used to actuate each vane 62A, 62B. Alternately, the vacuum source itself can be used to operate the vane 62A, 62B using a bellows actuator and a very small manual or electrically-operated pilot valve to control the bellows.

EXAMPLE 9A

Vane for X-Valve Assembly

Examples of vane that maybe used as vane 62A, 62B may be of any suitable plastic or metal material. The vane geometry is simple and easily fabricated out of nylon, aluminum, etc. An example of a vane useable as the vane 62A, 62B is vane 1062 (FIG. 10A) having a rounded pivot end 1063. The length 1064 of the vane 1062 cooperates with the geometry of the ports in the X-structure 801 which the vane 1062 will close; that is, the vane 1062 must be sufficiently long and wide to fully block the port closed, but without unnecessary overlap. In the constructed example, the vane length 1064 was about 1.5". In the constructed example, the vane width 1065 was about 1". FIG. 10B is a front view of the vane 1062.

The X-valve assembly and its components can be easily scaled for the intended application. In the example depicted herein, using a small (800 watt) vacuum motor and 5" impeller system, the X-valve system can easily handle about 200 lbs. of finely shredded paper and paper dust per hour. With higher vacuum power, it could easily handle double that volume per hour.

The inventive examples herein show X-plates and vanes configured together so as to achieve the desired overall system valve action (selecting one of two flow paths for two separate valve units) with the most economical number of parts, the simplest manifolding of fluid pathways, and greatest mechanical simplicity. This simplicity itself is inventive.

However, those practiced in the art will appreciate that the X-plates (FIG. 11) need not be used together to form an "X". A vane 1062 (FIG. 10A&B) could be used alone with a single X-plate alone in a simplified, single-port valve system. This is accomplished simply by placing the pivot point of the vane 1062 next to a port 1103A or 1103B (FIG. 11) as indicated in FIGS. 9A-9D. Similarly, an X-plate such as 1104 (FIG. 11) need not have two ports if only a single valve element is desired. The configuration of vanes and ports can easily be re-arranged to suit the cost constraints, available space, and geometry of the intended application.

In a configuration using a single "X-plate", two ports could be spaced so that one vane could selectively do any of the following:
1) open port A while closing port B,
2) open both ports (vane somewhere between closing either port)
3) open port B while closing port A.

In addition, a single "X-plate" might have several ports cut out of it, and several vanes might be appropriately mounted to open and close the ports.

Further, there is no requirement for an X-valve that configures the "X" at 60 degrees or any other specific angle. The "X" can be at any practicable angle that permits a vane to be mounted in and appropriate configuration to cooperate with the port(s) to perform the valve function.

This system can easily be adapted to handle liquids and slurries.

While the invention has been described in terms of a preferred embodiment, those skilled in the art will recognize that the invention can be practiced with modification within the spirit and scope of the appended claims.

We claim:

1. A valve assembly that comprises a valve comprising:
    an X-shaped structure,
    a first vane including a rounded pivot end and a second vane including a rounded pivot end; wherein the rounded pivot end of the first vane is fixed into a first angle of the X-shaped structure and the rounded pivot end of the second vane is fixed into a second angle of the X-shaped structure, the second angle being opposite the first angle, and the first angle and the second angle being equal;
    wherein each vane comprises a first flat port-closing edge for closing a port in the X-shaped structure that opens into a space in a vicinity of a vacuum port; and a second flat port-closing edge for closing a port in the X-shaped structure that opens into a space in a vicinity of an inlet through which dusty air enters; the first vane disposed for servicing a pair of such ports in the first angle; the second vane disposed for servicing a pair of such ports in the second angle.

2. The valve assembly of claim 1, wherein the first angle and the second angle are each 60 degree angles.

3. The valve system of claim 1, including an X-shaped valve system wherein the X-shaped valve system is a solids-handling valve which does not suffer from clogging.

4. The valve assembly of claim 1, useable in a shop-vac or a consumer home vacuum cleaner.

5. The valve assembly of claim 1, wherein the X-structure has a length of 7.4 inches and a height of 2 inches.

6. The valve assembly of claim 1, wherein the ports have a dimension of 1 inch by 1.5 inch.

7. The valve assembly of claim 1, wherein the vanes have an action in a range of about 0.02-0.3 seconds.

8. The valve assembly of claim 1, wherein the X-valve structure including the vanes handles about 200 pounds of finely shredded paper and paper dust per hour when an 800 watt vacuum motor and 5-inch impellar system is used.

9. The valve assembly of claim 1, including a pair of ports located in each of the first angle of the X-shaped structure and the second angle of the X-shaped structure, wherein each pair comprises a port, located in the X-shaped structure, that opens into a space in a vicinity of a vacuum port and a port, located in the X-shaped structure, that opens into a space in a vicinity of an inlet through which dusty air enters.

10. A method of cleaning a V-shaped or X-shaped valve, comprising:
    the valve performing self-cleaning by self-clearing dust and debris,
    wherein the valve comprises a vane pivot, comprising wiping action near the vane pivot.

11. A method for keeping a V-shaped or X-shaped valve assembly clean that comprises a vane servicing at least one port to self-clean of dust, the method comprising:
    moving the vane to a position different from a normal operating position of the vane and into a path of airflow moving in a direction that conducts a wiping action on at least the vane.

12. The method of claim 11, including (1) a wiping action near a pivot of the vane and/or (2) a wiping action on the vane and on a region near the port serviced by the vane.

13. The method of claim 11, wherein the valve assembly is an X-shaped valve assembly.

14. A valve assembly comprising:
    a V-shaped structure having a first wall and a second wall, the first wall having therein a first port and the second wall having therein a second port;
    a vane, the vane comprising:
        a curved end disposed into the V-shaped structure where the first wall and the second wall meet;
        a first flat edge sized to close the first port and a second flat edge sized to close the second port;
    wherein the vane is movably disposed into the V-shaped structure, with the vane pivoting between a first port-closed-position and a second-port-closed position.

15. The valve-assembly of claim 14, wherein the valve assembly is self-cleaning.

16. The valve assembly of claim 14, wherein the first wall and the second wall form a 60 degree angle.

17. The valve assembly of claim 15 comprising the V-shaped structure and a twin V-shaped structure formed in an X-shaped structure.

* * * * *

UNITED STATES PATENT AND TRADEMARK OFFICE
CERTIFICATE OF CORRECTION

| | | |
|---|---|---|
| PATENT NO. | : 8,074,671 B2 | Page 1 of 1 |
| APPLICATION NO. | : 12/133121 | |
| DATED | : December 13, 2011 | |
| INVENTOR(S) | : Charles A. Castronovo | |

It is certified that error appears in the above-identified patent and that said Letters Patent is hereby corrected as shown below:

On drawing sheet 2, please replace Fig. 3 and Fig. 4 of the patent with Fig. 3 and Fig. 4 shown below.

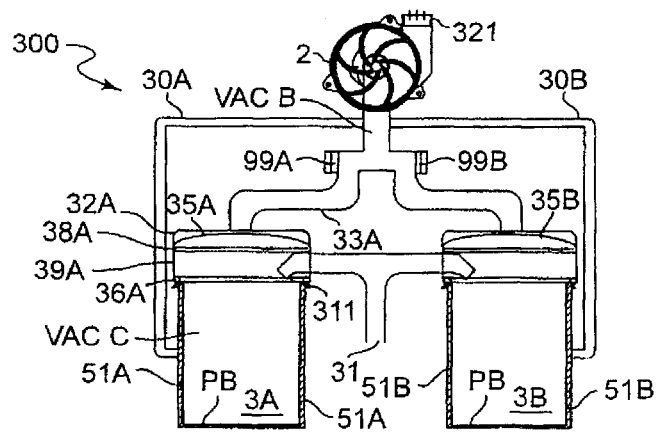

Figure 3

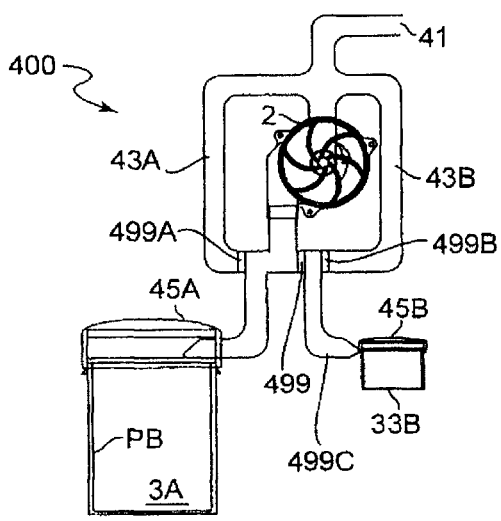

Figure 4

Signed and Sealed this
Fourteenth Day of February, 2012

David J. Kappos
*Director of the United States Patent and Trademark Office*